Oct. 22, 1968 A. J. ATRUBIN 3,407,290
SERIAL DIGITAL MULTIPLIER
Filed Sept. 3, 1965 24 Sheets-Sheet 1

INVENTOR
ALLAN J. ATRUBIN
BY Richard H. Smith
ATTORNEY

SERIAL DIGITAL MULTIPLIER

Filed Sept. 3, 1965 24 Sheets-Sheet 2

Oct. 22, 1968 A. J. ATRUBIN 3,407,290

SERIAL DIGITAL MULTIPLIER

Filed Sept. 3, 1965 24 Sheets-Sheet 10

Oct. 22, 1968 A. J. ATRUBIN 3,407,290

SERIAL DIGITAL MULTIPLIER

Filed Sept. 3, 1965 24 Sheets-Sheet 11

Oct. 22, 1968 A. J. ATRUBIN 3,407,290

SERIAL DIGITAL MULTIPLIER

Filed Sept. 3, 1965 24 Sheets-Sheet 13

Oct. 22, 1968 A. J. ATRUBIN 3,407,290

SERIAL DIGITAL MULTIPLIER

Filed Sept. 3, 1965 24 Sheets-Sheet 18

Oct. 22, 1968 A. J. ATRUBIN 3,407,290

SERIAL DIGITAL MULTIPLIER

Filed Sept. 3, 1965 24 Sheets-Sheet 22

Oct. 22, 1968 A. J. ATRUBIN 3,407,290

SERIAL DIGITAL MULTIPLIER

Filed Sept. 3, 1965 24 Sheets-Sheet 23

United States Patent Office 3,407,290
Patented Oct. 22, 1968

3,407,290

SERIAL DIGITAL MULTIPLIER

Allan J. Atrubin, Rochester, Minn., assignor to International Business Machines Corporation, Armonk, N.Y., a corporation of New York Filed Sept. 3, 1965, Ser. No. 484,826
14 Claims. (Cl. 235—164)

ABSTRACT OF THE DISCLOSURE

This invention relates to a multiplier where the multiplicand and multiplier digits are received in serial order and the product digits are calculated as early as possible without seeing fully the multiplier or the multiplicand. The invention implements the "sum-of-cross-products" multiplication algorithm in a new and unusual way. An examination of the algorithm reveals that if operand digits of order "$n$" and the lower are available, then product digits of order "$n$" and lower may be calculated without knowing the multiplier or multiplicand digits of higher order.

To perform the cross products and summations as called for in the algorithm, the invention uses serially connected cells. Each cell contains one stage of a shifting register and two storage registers for storing the same order digit for each operand. Each cell also contains a cross multiplying circuit, adding circuits for computing sum and carry digits, and sum and carry digit registers.

In operation, a serial string of multiplier and multiplicand bits are synchronized so that digits of the same order in the multiplier and multiplicand arrive at the left-hand side or the first cell of the multiplier simultaneously. Operand digits of the same order are defined as a digit set. The digit sets enter serially the serial arrangement of cells at the left-hand side and propagate to the right until they reach an unoccupied storage register.

As the digit sets are propagating to the right towards their eventual storage position, the cross multiplying and adding circuits are operating to generate partial products and carries. The partial product for a product digit of each order propagates to the left via the sum and carry digit registers through the cells towards the initial cell. When the partial product digit reaches the initial cell, it will represent the sum of all of the cross multiplications necessary to produce the product digit of that order. Thus, as digits serially enter the initial cell of the multiplier, product digits are serially passing out of the sum digit register of the initial cell of the multiplier.

This invention relates to serial digital multiplication and, more particularly, to a circuit for performing serial binary multiplication in real time, i.e., issue the first digit of the product a fixed period of time after receipt of the first operand digits, said period being independent of the size of the multiplier or the size of the operands.

In the prior art, serial digital multiplication has been performed primarily through implementation of the "successive addition" multiplication algorithm. This algorithm requires the accumulation of a succession of sub-sums, each sub-sum being generated by adding the multiplicand to itself a number of times equal to the value of one of the digits in the multiplier. The low order multiplier digit governs generation of the first sub-sum with successively higher order multiplier digits controlling generation of the later sub-sums. Before the sub-sums are totaled to derive the product, each is shifted one digit position to the left with respect to the sub-sum immediately preceding it. It can be seen that for binary operands, each sub-sum is either a duplication of the multiplicand or is zero.

Exemplary of the manner in which prior art circuits implement this algorithm for serial multiplication is a circuit wherein the digits of the multiplicand are serially regenerated into different inputs of a binary adder having a number of inputs equal to the number of digits in the largest expected multiplicand. Each regeneration of the multiplicand is delayed one digit time with respect to the preceding regeneration and is under the control of a digit of the multiplier. That is to say, when a zero occurs in the multiplier at a given digit time, the regeneration which is to take place during that digit time is blocked and, effectively, a row of zeros is entered into the adder in its place. Therefore, the adder receives, in parallel, during each digit time, one or more binary digit signals making up, in total, one digit of the product.

One prior art circuit arrangement for carrying out this scheme incorporates a delay line made up of a series of one digit-time delay circuits. The several inputs to the adding circuit are each connected, through a signal control gate, to the output of a different one of the delay circuits. The digits of the multiplicand are serially fed, low order digit first, into the delay line while the digits of the multiplier are successively employed, beginning low order digit first, to actuate the control gates. Thus if the first digit of the multiplier is a 1, it operates to open the zero control gate associated with the first adder input, allowing the digits of the multiplicand to be serially received thereby. If the second digit of the multiplier is a 0, it does not open the control gate associated with the second adder input and thus blocks the receipt thereby of the first regeneration of the multiplicand, which appears at the output of the first delay circuit. This process occurs until the digits of the multiplier are exhausted.

The added employed in this type of prior art multiplier is a parallel-cascade "tree" of two-input binary adding circuits arranged to converge to a single output. Thus, a four input adder has two "first level" adding circuits, each having two inputs and one output, and one "second level" adding circuit receiving the outputs of the first level adders and providing the final output. For such an adder to be capable of handling 16 input digits, the arrangement requires 15 individual two-input adding circuits including eight first level adders, four second level adders, two third level adders and one fourth level adder. Each time the capacity of the tree is doubled, another level of adding circuitry is required.

In extending the size of such prior art multipliers to perform serial multiplication upon operands having very large numbers of digital positions, several problems arise.

A first problem is that of digit synchronization within the adding tree. Each successive group of digit signals presented in parallel to the adder inputs must remain exactly parallel as it progresses through the levels of adding circuitry toward the single output. If this timing relationship is lost, the adder output will be erroneous. Theoretically, since all of the adding circuits within the tree are the same, the slight delay imposed on each digit signal progressing through a given circuit is the same. It is well known, however, that this condition is not met in practice and that the signal delay inherent in each circuit varies slightly from circuit to circuit. Thus, the larger the adding tree becomes, the greater is the likelihood that digit synchronization will be lost. The problem is further highlighted when the repetition rate of the incoming operand digits is increased, leading to correspondingly narrower digit signals which permit correspondingly less synchronization tolerance within the adding circuit.

The signal delay inherent in the adding tree causes a second problem in the expansion of the circuit to handle large operands. As has been previously brought out, the adding circuit of the prior art multiplier has a plurality of levels or serial stages of adding circuits the number of which depends upon the size of the multiplier, i.e., the number of operand digits which it is capable of handling. Due to signal delay, therefore, the period of time required for the first digits of the operands to initiate a product output digit signal also depends upon the size of the multiplier. Such a multiplier does not have real time capabilities, in accordance with the aforementioned definition of real time. In fact, it is conceivable that in some situations, when the adding tree is extremely large, the first digit of the product will not be available at the output until after all the digits of the operands have been received. In this extreme situation, the basic purposes of real time operation are defeated altogether.

It is therefore an object of the present invention to provide a serial digital multiplier which is capable of handling operands having a large number of digits without experiencing the aforesaid difficulties inherent in the serial digital multipliers of the prior art.

Another object is to provide a serial digital multiplier that does not operate upon the "successive addition" multiplication algorithm, but which operates upon the "sum of cross-products" multiplication algorithm.

Still another object is to provide a serial digital multiplier of "iterative" design, i.e., being constructed of a plurality of similarly structured and interconnected units which may be assembled, like building blocks, into a multiplier of any desired size.

In accordance with the present invention there is provided a serial digital multiplier which implements the "sum of cross-products" multiplication algorithm. This algorithm, which is the most common method by which "long-hand" multiplication is performed, requires each digit of the multiplicand to be multiplied by each digit of the multiplier, the individual cross-products thereby generated being summed in accordance with predetermined rules to obtain the product of the operands.

In implementing this algorithm the present invention is embodied in iterative (composed of a plurality of similarly structured and interconnected modules) electrical circuits which serially propagate the signals representing the digits of the operands along a data path for the purpose of multiplying, in a predetermined sequence, the digits in each pair of like order operand digits and for the further purpose of sequentially cross-multiplying each pair of like order operand digits by groups of previously received pairs of like order operand digits until each pair of like order digits has been cross-multiplied by every other pair of like order digits. To cross-multiply one such pair of digits by another requires that the multiplicand digit of one said pair be multiplied by the multiplier digit of the other pair, resulting in two cross-product digits. As the cross-product digits are thus being generated in this predetermined sequence, they are grouped in accord with the product digit to which they contribute and are summed to yield the digits of the product, beginning low order digit first.

As hereinafter described, the invention is embodied in two somewhat differently designed circuits, one, hereinafter referred to as a "no delay embodiment," initiating output of the product digits during the same digit time period in which the low order digits of the operands are received and the other, hereinafter referred to as a "unit delay embodiment," initiating output of the product digits one digit time period after the low order digits of the operands are received. In the latter circuit, the iterated components or "cells" thereof are exactly identical to one another while in the former the cells are identical except for the initial cell, which departs slightly from the general cell design.

One particular advantage deriving from this iterative design is convenience of fabrication, especially insofar as large capacity multipliers are concerned. Such a feature is especially desirable from a cost standpoint when the individual cells are fabricated by high volume, low cost integrated circuit methods.

The foregoing and other objects, features, and advantages of the invention will be apparent from the following more particularly description of preferred embodiments of the invention, as illustrated in the accompanying drawings.

Figure 4:
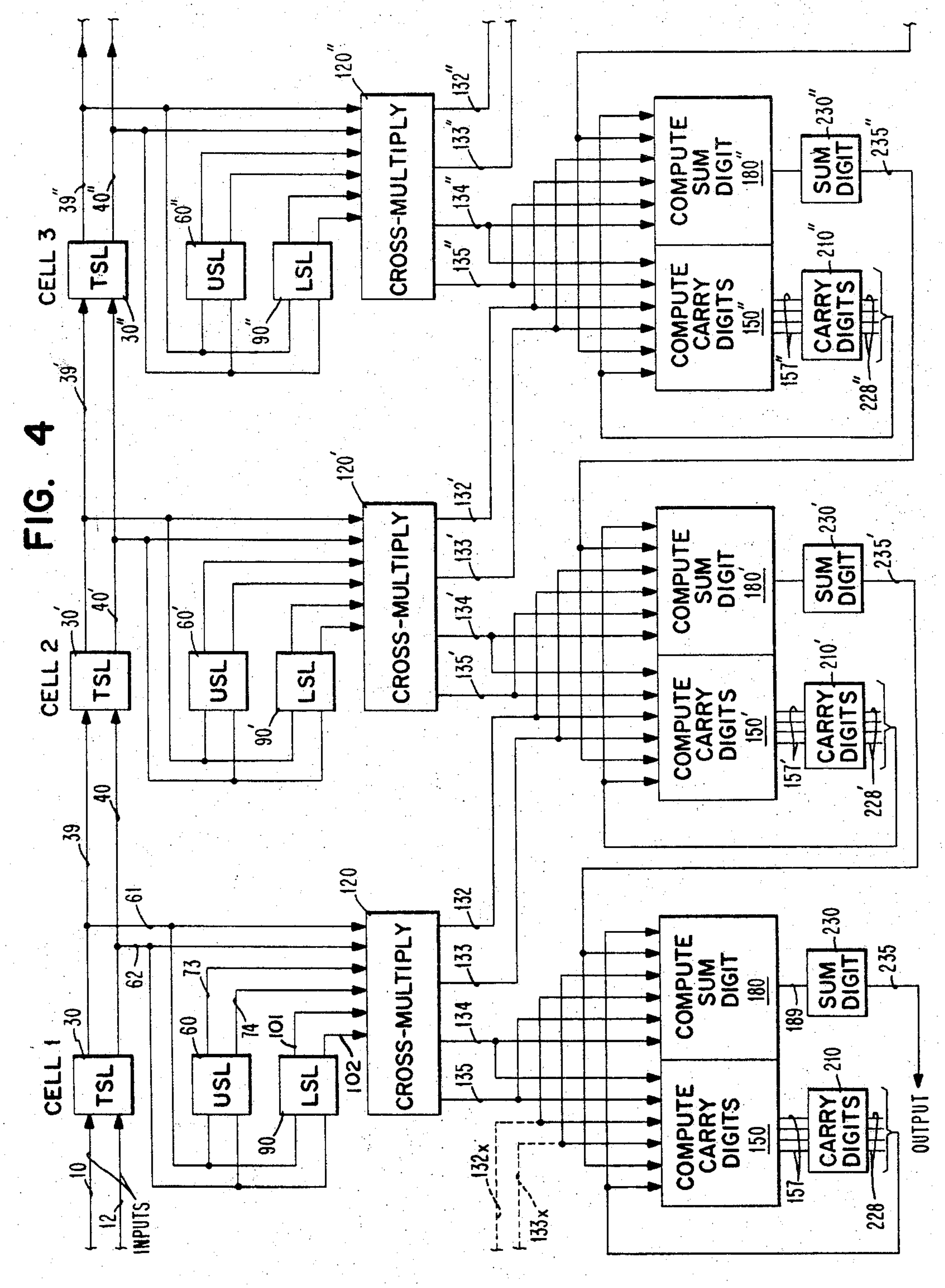
FIG. 4 is a block circuit diagram showing the general circuit arrangement of the various circuit components contained in three consecutive cells of a binary, unit-delay embodiment of the invention.
Figure 5A:
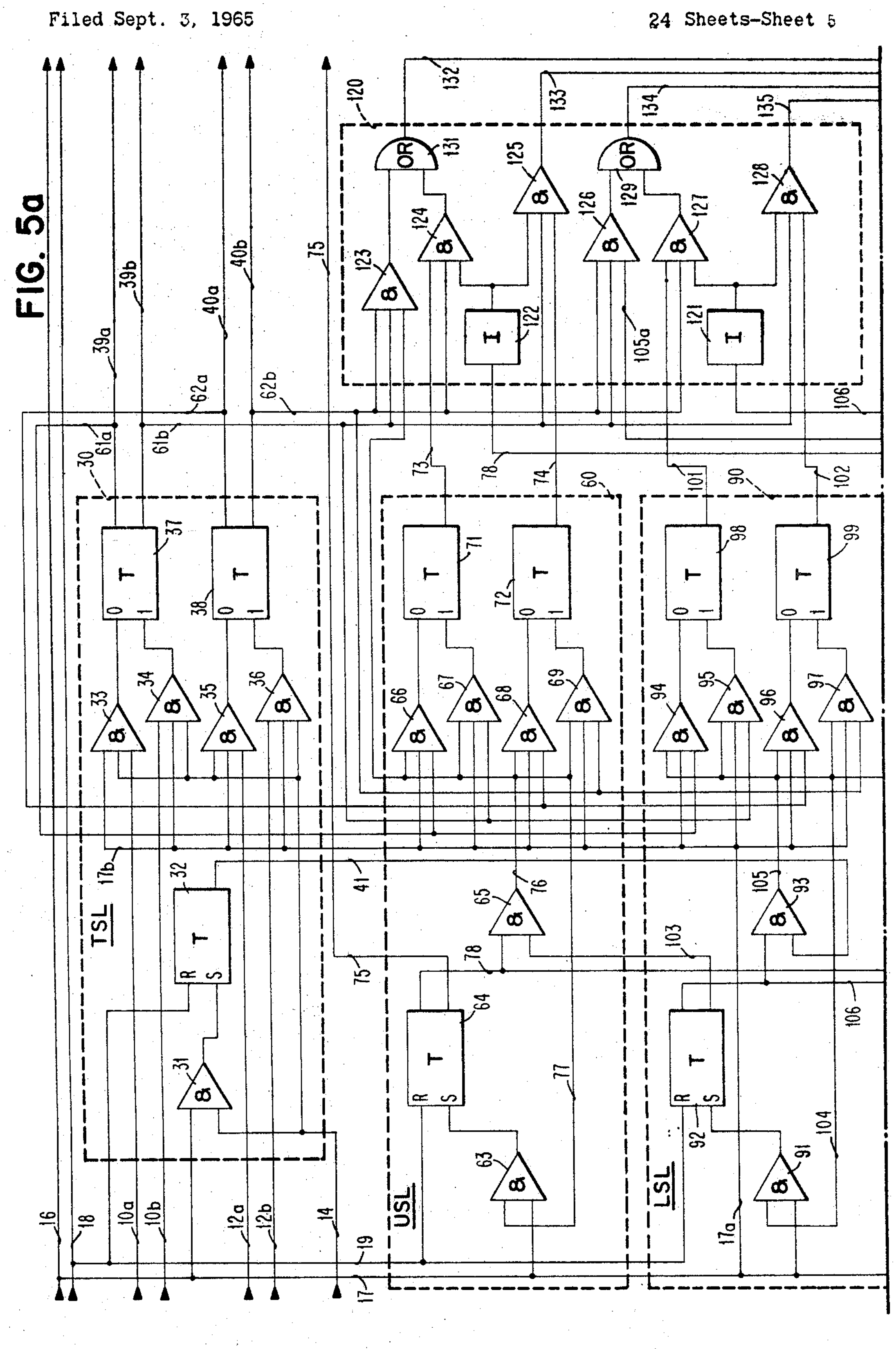
Figure 5B:
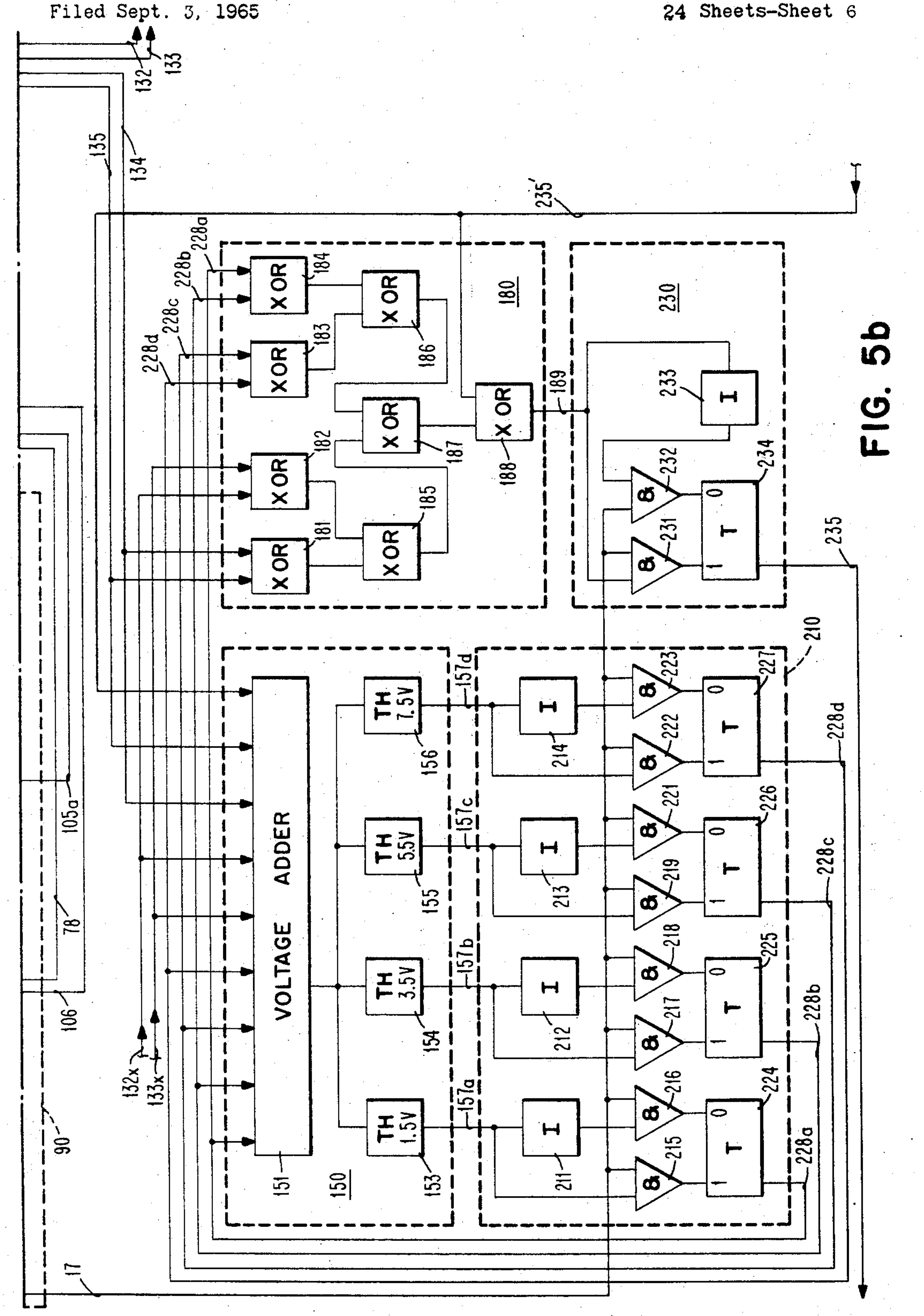

FIGS. 5*a* and 5*b* taken together, are a schematic circuit diagram showing cell 1 of the multiplier of FIG. 4 in detail.

Figure 6:
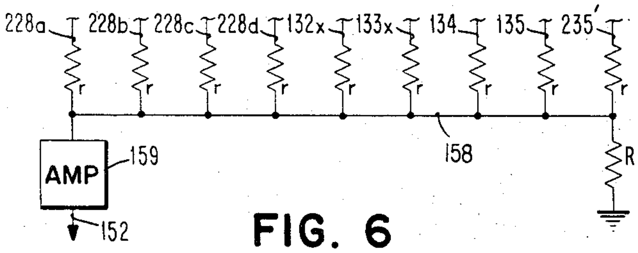

FIG. 6 is a circuit diagram of a voltage adder which may be employed in the circuit of FIG. 5*b*.

Figure 7:
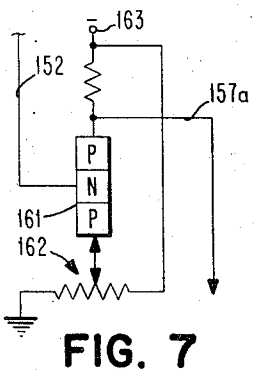

FIG. 7 is a circuit diagram of a threshold circuit which may be employed with the voltage adder of FIG. 6.

Figure 8:
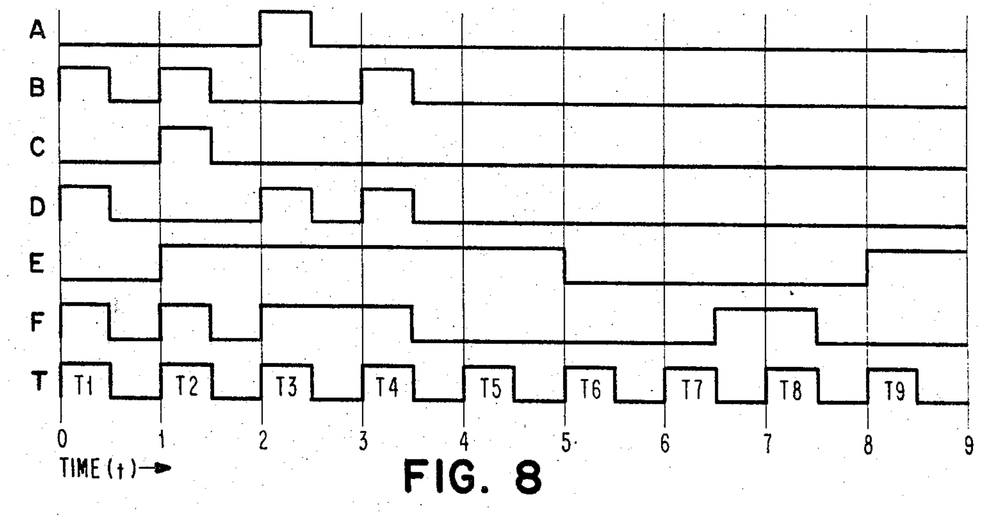

FIG. 8 is a waveform diagram showing the timing relationship between various signals occurring during operation of the circuit embodiments herein taught.

FIGS. 9*a*–9*i* are schematic diagrams illustrating the step-by-step operation of the multiplier of FIG. 4 in generating the product of two four-digit binary operands.

Figure 10:
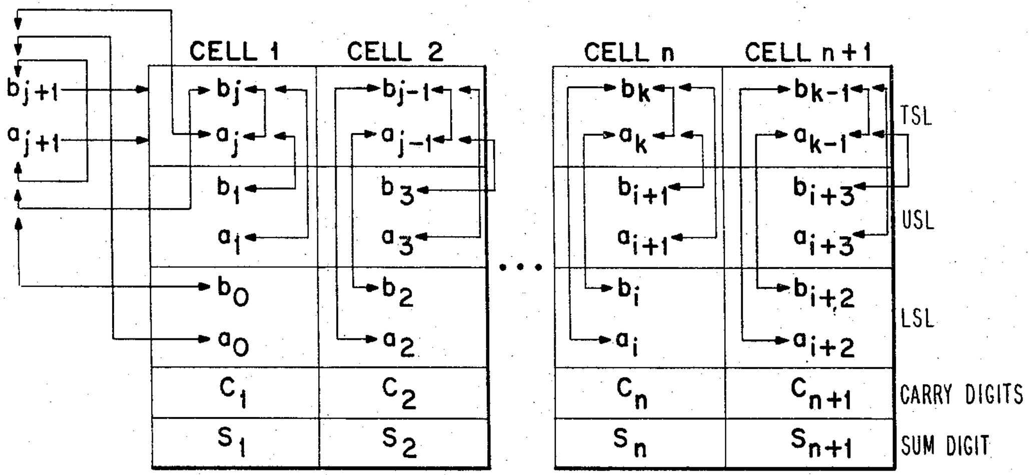

FIG. 10 is a diagram illustrating, in connection with mathematical equations hereinafter presented, the cross-multiplication operations performed, during a given time period, on the operand digits appearing in four cells of a no-delay embodiment of the invention. Further illustrated are the summation digits compiled from the resultant cross-products.

Figure 11:
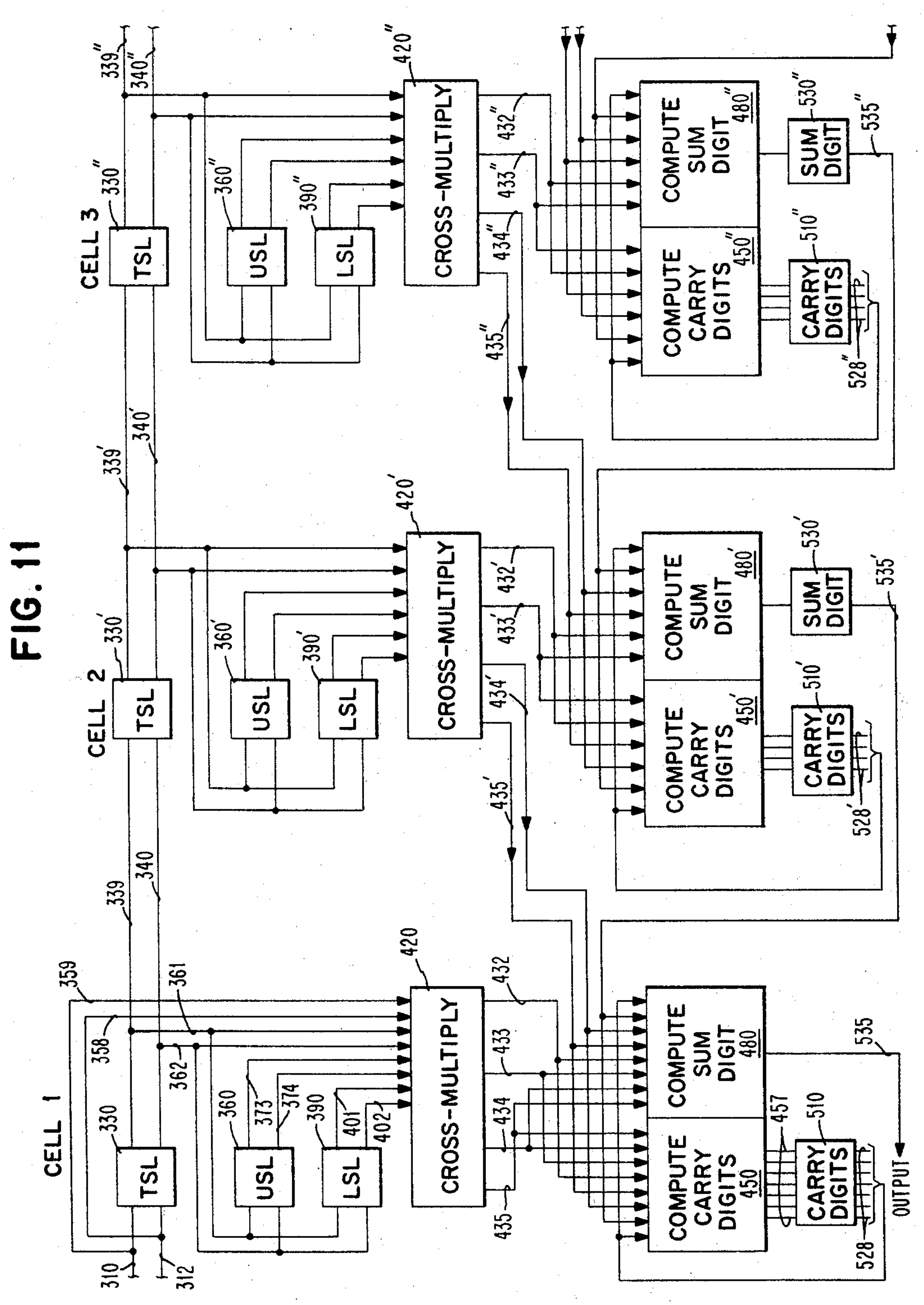

FIG. 11 is a block circuit diagram showing the general circuit arrangement of the various circuit components contained in three consecutive cells of a binary, no-delay embodiment of the invention.

Figure 12A:
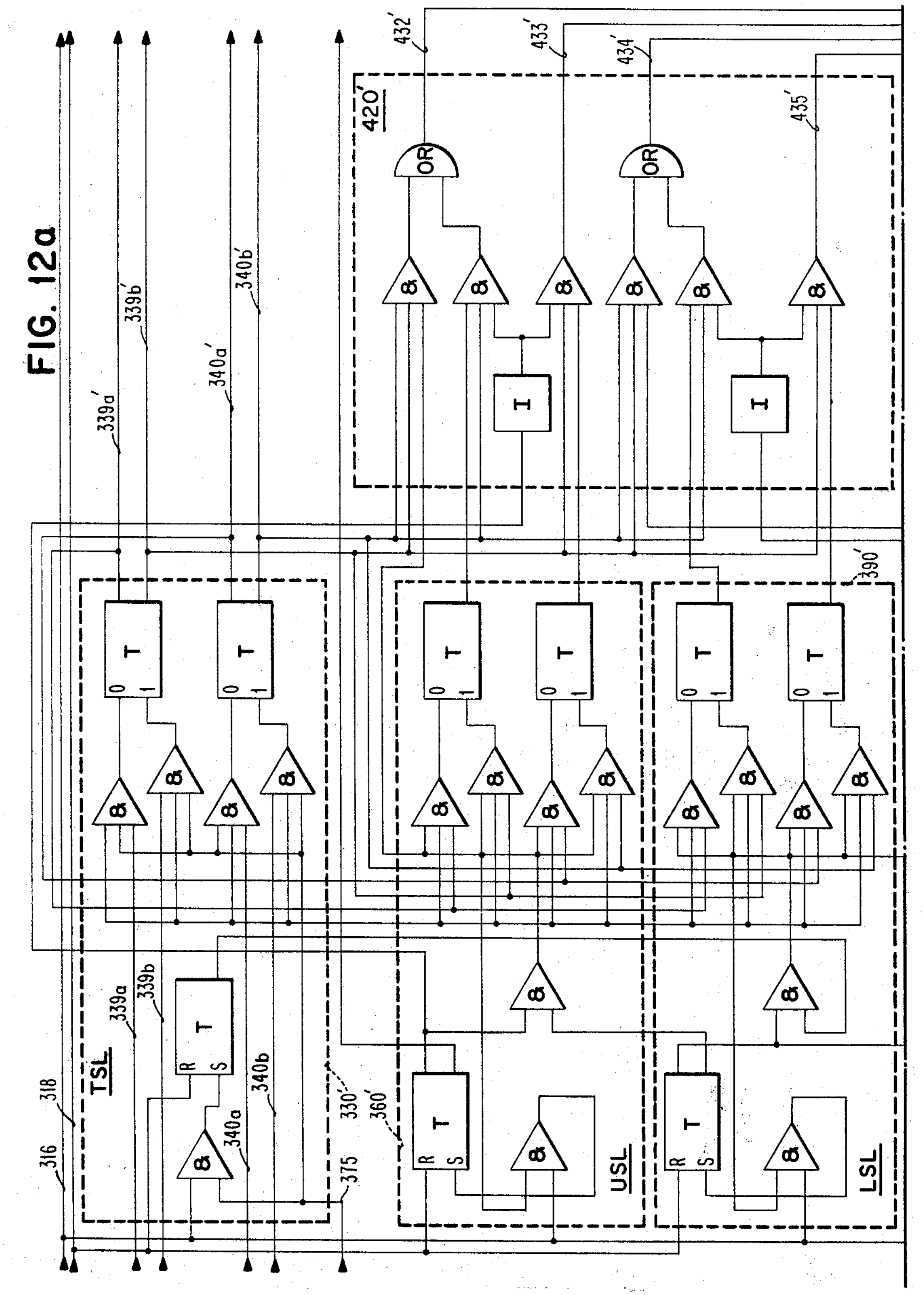
Figure 12B:
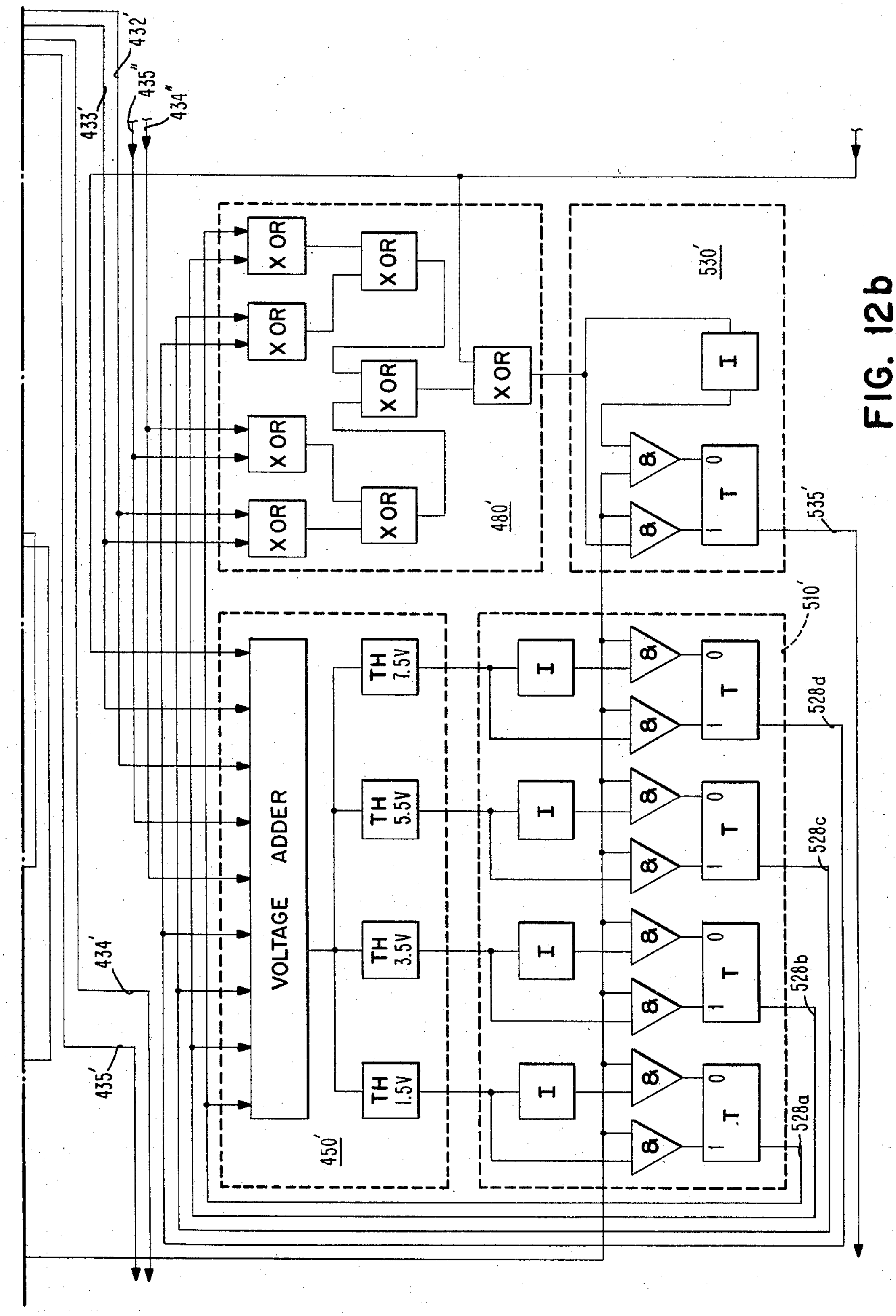

FIGS. 12*a* and 12*b* taken together are a schematic circuit diagram showing cell 2 of the multiplier of FIG. 11 in detail.

Figure 13A:
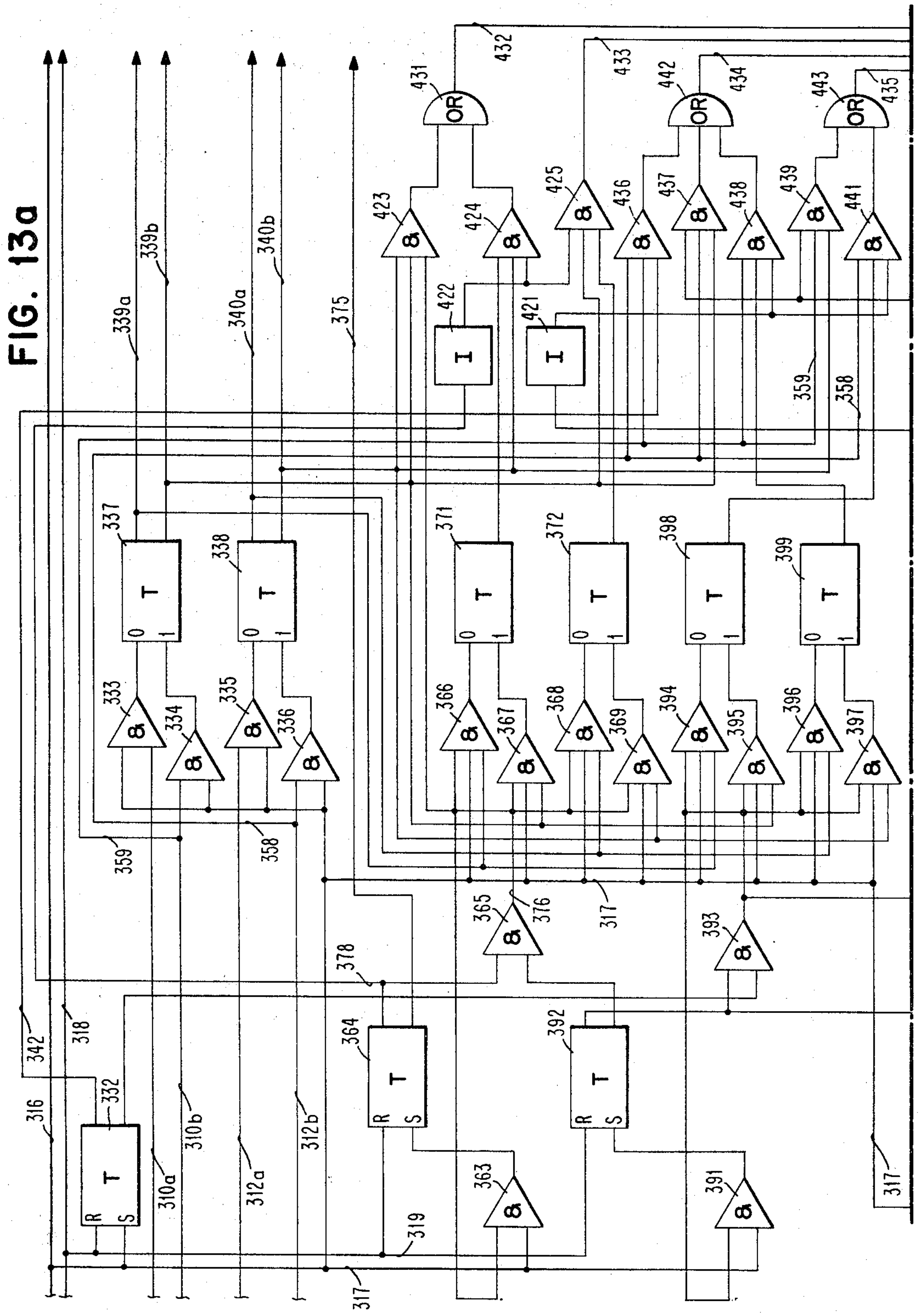
Figure 13B:
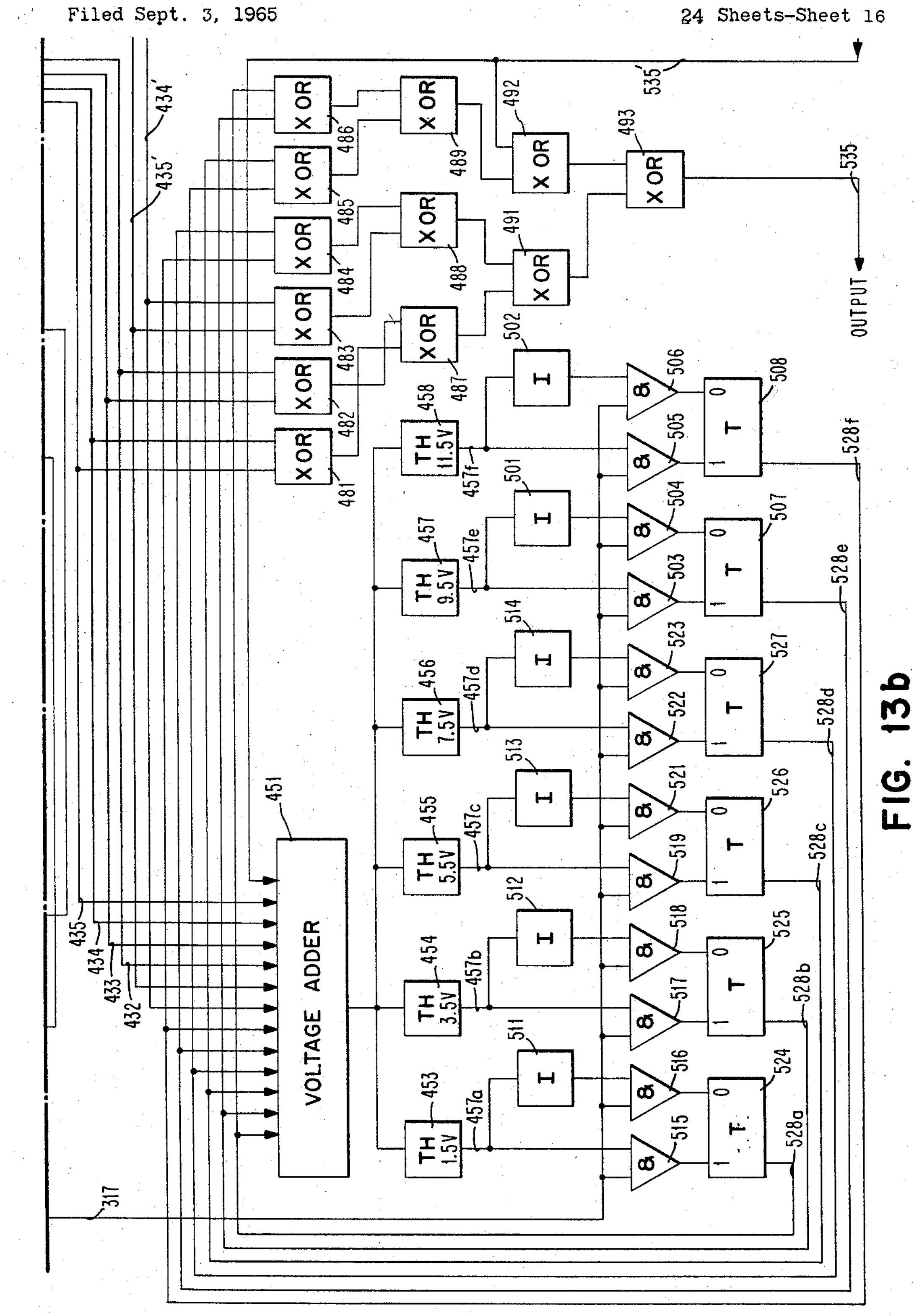

FIGS. 13*a* and 13*b*, taken together, are a schematic circuit diagram showing the initial cell of the multiplier of FIG. 11 in detail.

FIGS. 14*a*–14*h* are schematic diagrams depicting the step-by-step operations of the multiplier of FIG. 11 in generating the product of the same four digit binary operands employed in describing the operation of the circuit of FIG. 4.

Referring to the drawings, a detailed description of preferred embodiments of the invention is hereinafter given.

Discussion of general principles

Figure 1:
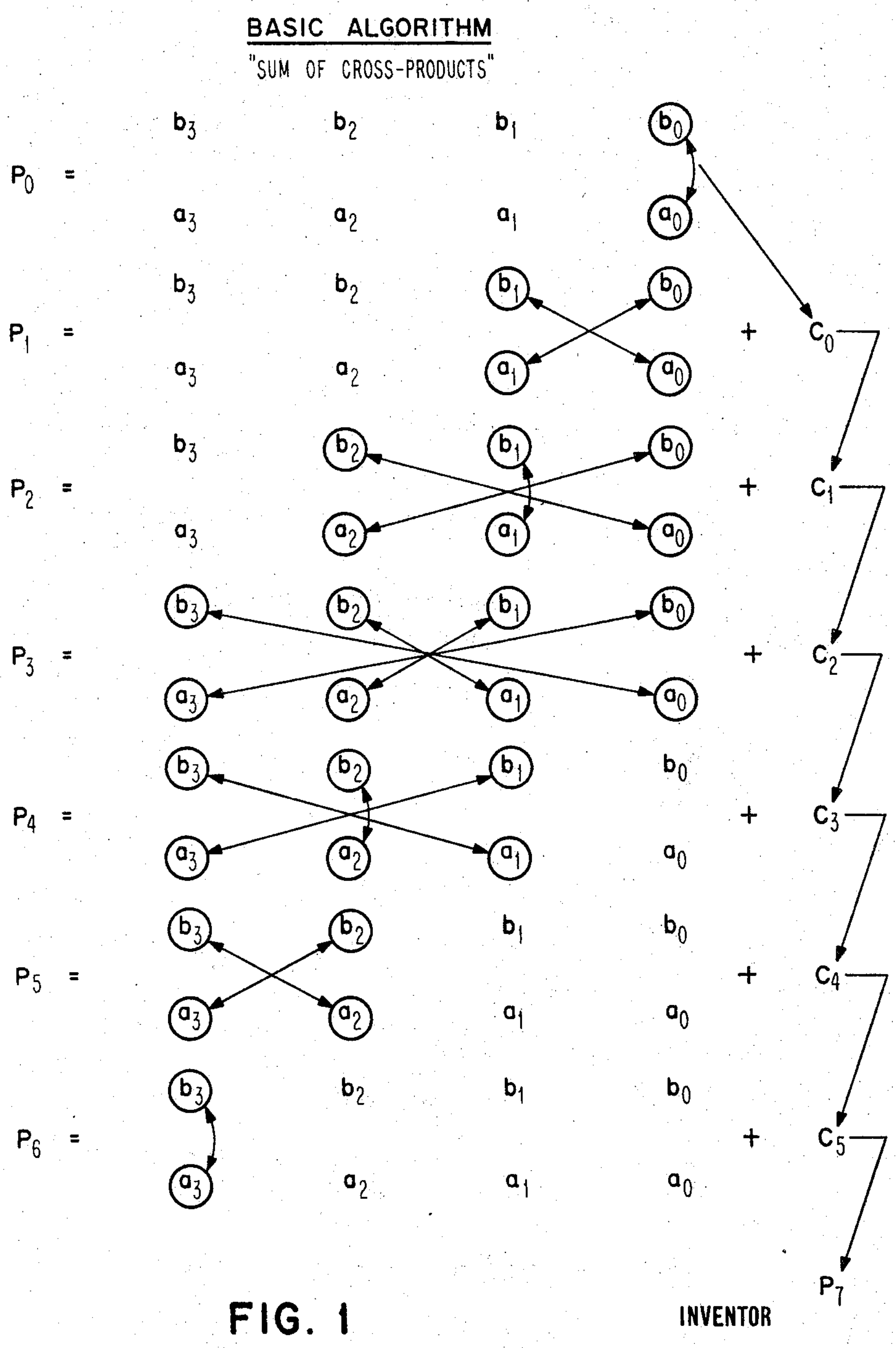
FIG. 1 is a diagram graphically depicting the manner in which the individual digits of a pair of operands $a_3a_2a_1a_0$ and $b_3b_2b_1b_0$ are manipulated in accordance with the "sum of cross-products" algorithm to yield the product $P_7P_6P_5P_4P_3P_2P_1P_0$.
Figure 2:
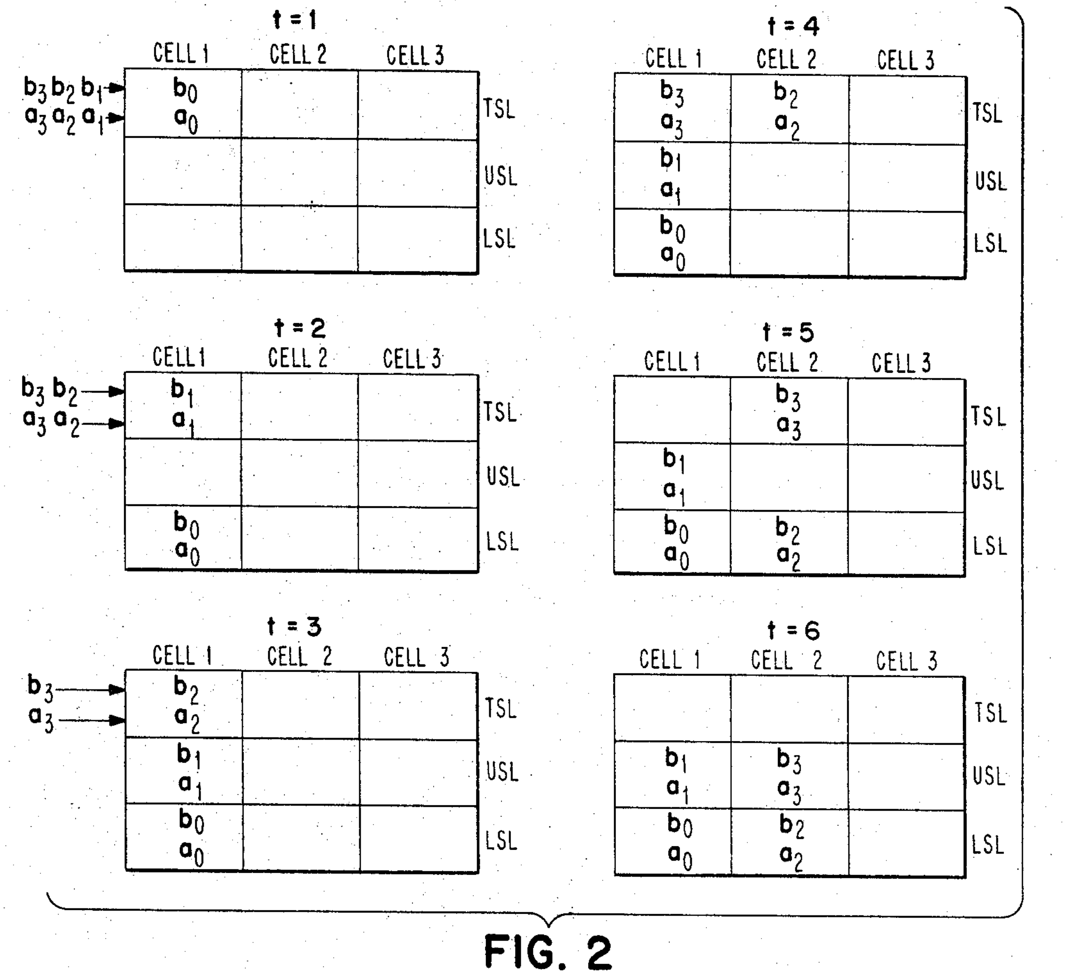
FIG. 2 is a diagram depicting the sequence in which hypothetical operands are received and stored in the digit shifting and storage portions of the circuits of the invention.

With reference to FIGS. 1 and 2, certain fundamental principles necessary to an understanding of the invention are described.

Represented in FIG. 1 are the mathematical operations necessary for compilation of each of the digits $P_7P_6P_5P_4P_3P_2P_1P_0$ of the product formed through multiplication of a first operand $b_3b_2b_1b_0$ by a second operand $a_3a_2a_1a_0$ (the subscript 0 denotes the low order digit of each number). The mathematical operations illustrated are those performed according to the well-known "sum of cross-products" multiplication algorithm.

A double-headed arrow pointing to two encircled digits indicates multiplication of one such digit by the other. Thus, as seen at the top of the figure, the product digit $P_0$ is formed by multiplying digit $b_0$ by digit $a_0$. $P_0$ is the low order digit of the cross-product $a_0b_0$. Higher order cross-product digits, if any, are represented by the symbol $C_0$.

At this point it should be noted that $C_0$ will always be 0 in the binary system since the product of two binary digits is always a single digit. In binary multiplication the product of two ones is a one while all other digit combinations yield zero.

The next higher order product digit, $P_1$, is the low order digit of the sum of $a_0b_1$, $a_1b_0$ and $C_0$. Higher order digits, if any, resulting from this summation operation are defined by the symbol $C_1$. The remaining digits of the product, $P_2$ through $P_7$, are generated in this same manner, the appropriate cross-products being summed with the previous carry digit(s) to yield the product digit. In each instance, the appropriate cross-products are obtained by multiplying all pairs of operand digits having, in the notation used in FIG. 1, subscripts which total the subscript of the product digit being determined. Thus the cross-products required in calculating, for example, $P_3$ are $a_0b_3$, $a_3b_0$, $a_2b_1$ and $a_1b_2$.

Since the total number of digits in both operands is eight, the product will include a maximum of eight significant digits.

Definitions

The terminology used hereinafter in reference to the operations above set forth is defined as follows:

"Digit set"—a pair of operand digits of like digital order. Thus, $a_0$ and $b_0$ constitute the first or low order digit set in the example of FIG. 1, while $a_1$ and $b_1$, $a_2$ and $b_2$, etc., constitute subsequent, higher order digit sets.

"Cross-multiplication of two digit sets"—multiplication of the multiplicand digit of a first digit set by the multiplier digit of a second digit set and multiplication of the multiplicand digit of the second digit set by the multiplier digit of the first digit set. Thus, as shown in FIG. 1, the first and second order digit sets ($a_0$, $b_0$ and $a_1$, $b_1$) are cross-multiplied in obtaining product digit $P_1$.

"Cross-product digits"—the digits resulting from cross-multiplication of one or more digit sets and from multiplication of the digits of a single digit set.

"Sum digit"—the lower order digit of the sum of a plurality of cross-product and carry digits.

"Carry digit"—the digits, other than the sum digit, of the sum of a plurality of cross-product and previously generated carry digits.

As is apparent from FIG. 1, knowledge, by the multiplier, of the low order digits of the operands is all that is necessary to enable calculation of the low order digit of the product. Similarly, knowledge of the next higher order digit set, together with the first digit set, is all that is required to produce the second digit of the product, etc. It is therefore possible for a serial digital multiplier to issue the low order digit of the product at practically the same instant that it receives the low order digits of the operands and to continue issuing product digits as fast as it receives further operand digits. To do this the multiplier must, upon receiving a new digit set, calculate and collect previously calculated cross-products which contribute to the product digit then being computed and sum these cross-products, together with any carry digit remaining from computation of the previous product digit. With reference to FIG. 2, a general discussion is hereinafter given regarding the manner in which the circuits of the invention perform these two operations, i.e., obtain and sum the cross-products.

FIG. 2 diagrammatically depicts portions of the first three cells of a multiplier in accordance with the invention, during each of six time intervals. The top section of each cell is a transient storage location (TSL) and the middle and lower sections of each cell are, respectively, an upper storage location (USL) and a lower storage location (LSL), each of which comprises, as will subsequently be described, a plurality of bistable circuits capable of storing at least one digit set.

The digit sets of the operands are entered, low order digit set first, into the TSL of the first cell at a rate of one digit set per predetermined time interval and are thereafter shifted to different storage locations in accordance with the following predetermined sequence. The first two digit sets received in the TSL of cell 1 are shifted therefrom during the second and third time intervals into the storage locations of cell 1, the LSL being filled first. Subsequent digit sets are shifted from the TSL of cell 1 to the TSL of cell 2 and, after the storage locations of cell 2 are filled, to the TSL of cell 3, etc. It is thus seen that the digit sets received are shifted through the TSL's of each of the cells until they arrive at a cell having an unoccupied storage location, whereupon they are shifted out of the TSL and into that storage location. As a general rule, then, it may be said that the number of cells required in a multiplier constructed in accordance with the present invention must be approximately half the number of digits in the largest expected operand.

The cross-products are obtained as follows: during each time interval the digit set residing in the TSL of each cell is cross-multiplied by the digit sets stored in the USL and LSL associated with the same cell. In addition, the digits in each digit set are multiplied by each other during the time interval immediately preceding that in which they are shifted from a TSL to storage. These rules for obtaining cross-products hold true for all cells of both embodiment of the invention, except for the first cell in the no-delay embodiment. To avoid unnecessarily complicating the description at this point, the details of this exception, and the reasons therefor, are withheld until the subsequent description of the no-delay embodiment.

As cross-product digits are being generated in the manner just described, they are systematically grouped and summed during each time interval to yield the digits of the product. This is done, in accordance with the invention, through identical accumulation operations performed each time interval in each cell to generate, in each cell, a set of sum and carry digits. Generally speaking, this is done as follows: in each given cell the cross-product digits which are generated during the current time interval in that cell and in a cell immediately adjacent thereto and which contribute to the same digit of the product are added to the carry digits generated during the preceding time interval in said given cell and to the sum digit generated during said preceding time interval in the cell immediately to the right (referring to FIG. 2) of said given cell.

Since this product summing operation is performed differently in the unit-delay and no-delay embodiments of the invention, the subsequent more detailed descriptions will deal with the two embodiments separately, the unit-delay embodiment being taken first.

Unit-delay embodiment—General

Figure 3:
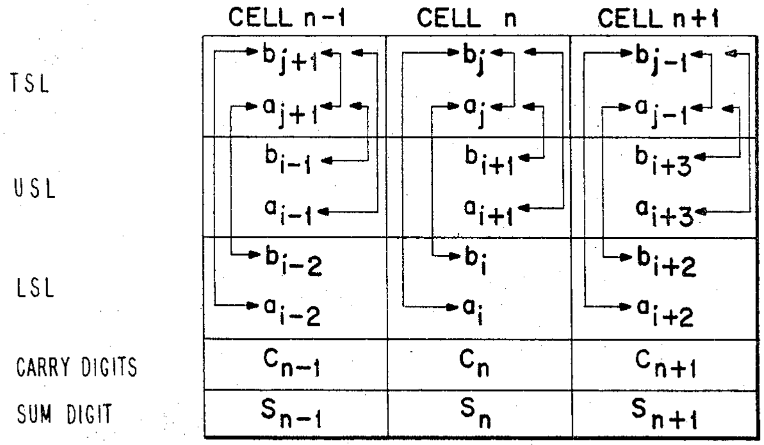
FIG. 3 is a diagram illustrating, in connection with mathematical equations hereinafter presented, the cross-multiplication operations performed, during a given time period, on the operand digits appearing in three consecutive cells of a unit delay embodiment of the invention. Further illustrated are the summation digits compiled from the resultant cross-products.

FIG. 3 shows three consecutive cells, $n-1$, $n$ and $n+1$, of a unit-delay multiplier in accordance with the invention. In addition to the three previously discussed storage locations, the TSL, USL and LSL, each cell has a sum digit storage location and a carry digits storage location. The digit values $S_n$ and $C_n$ which are calculated and stored in cell $n$ each time interval are derived in accordance with the following mathematical expressions having particular application to a system wherein all digit values are represented in binary notation. It is to be noted that these expressions are general and apply in an identical fashion to all cells in the unit-delay multiplier.

For cell $n$:

$$E'_n=(a_jb_i+a_ib_j)(1-V_n)+a_jb_jV_n+(a_{i-1}b_{j+1}+a_{j+1}b_{i-1})(1-U_{n-1})+a_{j+1}b_{j+1}U_{n-1}+C_n+S_n+_1$$

where:

$U_{n-1}=1$ if LSL of cell $n-1$ is filled and USL of the same cell is empty and is 0 otherwise;

$V_n=1$ if both LSL and USL of cell $n-1$ are filled and LSL of cell $n$ is empty and is 0 otherwise.

then:

$$S'_n=E'_n\text{Mod } 2 \quad (1)$$

$$C'_n=1/2(E'_n-S'_n) \quad (2)$$

As will become apparent from the following more detailed discussion of this embodiment, the cooperative operation of a chain of cells, each performing according to the mathematical expressions set out above, results in the digits of the final product being accumulated in a step-by-step fashion in the sum digit storage locations of the chain and being shifted, one cell per time interval, toward the left so that the sum and carry digits appearing each time interval in the first cell represent the product and carry digits (P and C of FIG. 1) for a particular product digit position. Thus, an output from the multiplier may be taken directly from the sum digit storage location of the first cell.

Unit-delay embodiment—Detailed description

FIG. 4 shows the general circuit details of a three cell binary unit-delay multiplier. It is apparent at the outset that the circuit design of each cell and the interconnection of one cell to the next is identical for all cells.

The digit sets of the operands, in the form of serial electrical signals, are received from an external digit generation source (not shown) and are entered on input lines 10 and 12 into TSL 30 of cell 1. As will be subsequently described in detail, TSL 30 comprises a pair of bistable circuits accompanied by appropriate gating circuits. A set of output lines 39 and 40 extending from TSL 30 are maintained at voltage levels representative of the digit values stored in TSL 30, thus serving to condition the inputs to TSL 30', and, through lines 61 and 62, USL 60 and LSL 90.

Digit sets are shifted through TSL 30 to LSL 90, USL 60, TSL 30', etc., in accord with the digit shifting sequence previously discussed in connection with FIG. 2.

A pair of output lines 73 and 74 extending from USL 60 are maintained at voltage levels representative of the binary values of digits stored in USL 60 and in like manner a pair of output lines 101 and 102 connected to LSL 90 are held at voltage levels representative of the digit values stored therein. Corresponding output lines operate similarly with regard to USL 60' and LSL 90' of cell 2 and USL 60'' and LSL 90'' of cell 3.

Each set of binary digit values appearing on output lines 61, 62, 73, 74, 101 and 102 is received by a cross-multiplication circuit 120. Circuit 120, to be subsequently described in detail, contains logic circuitry to generate the appropriate binary cross-product digits in accordance with Equations 1 and 2, supra. Electrical signals representative of the binary values of these cross-products appear at four output lines 132, 133, 134 and 135. Corresponding multiplication circuits 120' and 120'' are provided in cells 2 and 3, respectively.

A pair of computation circuits 150 and 180 in cell 1 contain appropriate logic circuitry for carrying out the mathematical operations of, respectively, Equations 2 and 1 for determining a new set of carry and sum digits each time interval. Electrical signals representative of up to four carries appear on output lines 157 from circuit 150 and are gated for temporary storage into a carry digits storage circuit 210, which, as will be subsequently described, comprises a plurality of bistable circuits. An electrical signal representative of the binary value of the sum digit appears on output line 189 of circuit 180 and is gated for temporary storage into a sum digit storage circuit 230, which, as will be subsequently described, comprises one bistable circuit. Output lines 228 from circuit 210 and 235 from circuit 230 are maintained at voltage levels representative of the values of the binary digits stored in the respective storage circuits.

The computation circuits 150', 180' and 150'', 180'' of cells 2 and 3 are identical to the circuits 150 and 180. This is true also for the circuits 210', 230' and 210'', 230''.

The carry digit information stored in the circuits 210, 210' and 210'' is fed back to the inputs of the computation circuits 150–180, 150'–180' and 150''–180'', respectively, as required by Equations 1 and 2. The sum digit appearing on line 235 constitutes, as previously mentioned, a final product digit, thereby making line 235 the multiplier output. The corresponding lines 235' and 235'' of cells 2 and 3 are fed to the carry and sum digit computation circuits 150, 180 and 150', 180', respectively, as required by Equations 1 and 2.

Since there is no cell to the left of cell 1, lines 132x and 133x are in fact superfluous and are thus shown as dash lines on FIG. 4.

Referring now to FIGS. 5*a* and 5*b*, taken together, a detailed description will be given of each of the circuits of FIG. 4. Since all cells are identically constructed, the following descriptions of the circuits of a single cell, cell 1 suffice for all cells in the multiplier.

TSL 30

As shown in FIG. 5*a*, TSL 30 includes a pair of bistable trigger circuits 37 and 38 having inputs derived, respectively, from four AND gates 33, 34 and 35, 36. Trigger circuits 37 and 38 may be of the type shown and described in connection with FIGURES 4–12 (*a*) of Digital Computer Components and Circuits, D. Van Nostrand Company (1957), by R. K. Richards, or may be any similarly acting circuit. TSL 30 further includes a gating trigger 32 having an AND gate 31 coupled to its set input. As will be described hereinafter, trigger 32 operates with other gating triggers in USL 60 and LSL 90 to control the sequence in which digit sets are shifted and stored.

A common bus 16 provides a supply of timing pulses which define the basic time intervals to which the operation of the multiplier is referenced. Timing pulses occur continuously at fixed intervals. The signals representing the operand digit sets occur coincidentally with the timing pulses.

Input lines **10*a*, 10*b*, and 12*a*, 12*b* feed operand digit set signals to AND gates 33, 34 and 35, 36, resepctively. These AND gates pass the digit signals as hereinafter described to the inputs of triggers 37 and 38**. A binary "1" appearing in the *b* operand is manifested as a positive square-wave (pulse) on line **10*b* accompanied simultaneously by a zero level (no pulse) signal on line 10*a***. Conversely, a binary "0" in the *b* operand is represented by a positive pulse on line **10*a* accompanied by a zero level on line 10*b*. Similar signals appearing on input lines 12*a* and 12*b*** represent the digits of the *a* operand.

Timing line 17, connected to timing bus 16, supplies timing pulses to a first input of AND 31 while a second input thereto is supplied by a line 14, which may be connected to a source of input voltage through a master "on-off" switch (not shown). An "on" voltage thus applied to line 14 partially conditions AND gates 33, 34, 35 and 36, enabling them to admit, in conjunction with timing pulses from line **17*b*, digit input signals to the triggers 37 and 38 for storage. The input signal on line 14 also coacts with the first timing pulse to activate AND 31, thus setting trigger 32**.

LSL 90

As shown in FIG. *5a*, LSL 90 comprises a pair of trigger circuits 98 and 99 in combination with a set of input AND gates 94, 95, 96 and 97, identical to the arrangement above described for TSL 30. A further AND circuit 93 receives its inputs from the set output line 41 of gating trigger 32 and from the reset output of a gating trigger 92. Since trigger 92 is initially in a reset state, AND 93 is activated, providing an output signal on line 105, as soon as trigger 32 is switched to its set state. The signal on line 105 is fed back via line 104 to one input of an AND circuit 91, the output of which is coupled to the set input of trigger 92. The second input to AND 91 is taken from timing line 17, thereby enabling trigger 92 to be set by the first timing pulse occurring after trigger 32 has been set.

The inputs to AND gate 94, which is coupled to the "zero" input of storage trigger 98, are derived from line 105, timing line **17*b* and from the "zero" output line 39*a* of TSL 30 trigger 37 through conductor 61*a*. The inputs to AND gate 95, which has its output coupled to the "one" input of trigger 98, are derived from line 105, timing line 17*b* and "one" output line 39*b* of trigger 37 through the line 61*b*. The inputs to AND gate 96, which has its output connected to the "zero" input of trigger 99, are derived from line 105, timing line 17*b* and from "zero" output line 40*a* of TSL 30 trigger 38 through conductor 62*a*. The inputs to AND gate 97, which has its output connected to the "one" side of trigger 99, are derived from line 105, timing line 17*b* and the "one" output line of trigger 38 through conductor 62*b***.

This arrangement allows digit signals stored in triggers 37 and 38 to be transferred to the AND gates 94, 95, 96 and 97 of the corresponding inputs to storage triggers 98 and 99. Since the setting of trigger 32 activates line 105, the first timing pulse occurring thereafter gates the digit set stored in triggers 37 and 38 into the triggers 98 and 99 of LSL 90. The same timing pulse activates AND 91, setting trigger 92, which turns off line 105, deconditioning AND gates 94, 95, 96 and 97 and turning on line 103.

USL 60

As shown in FIG. *5a*, USL 60 includes a pair of trigger circuits 71 and 72 having input AND gates 66, 67, 68 and 69 arranged in the manner previously described for the storage triggers of TSL 30 and LSL 90. An AND circuit 65 derives one of its inputs via the line 103 and has its other input coupled to the reset output of a gating trigger 64. Since trigger 64 is initially in a reset condition, output line 76 of AND 65 is activated as soon as trigger 92 is set. The signal on line 76 is fed back via line 77 to one input of an AND circuit 63, the output of which is coupled to the set input of trigger 64. The second input to AND 63 is taken from timing line 17, thereby enabling trigger 64 to be set by the first timing pulse occurring after trigger 92 has been set.

The inputs to AND 66 are derived from lines 76, timing line **17*b* and the "zero" output of TSL trigger 37 via line 61*a*. The inputs of AND 67 are derived from line 76, timing line 17*b* and the "one" output of trigger 37 via conductor 61*b*. The inputs to AND 68 are derived from line 76, timing line 17*b* and the "zero" output of TSL trigger 38. The inputs to AND 69 are derived from line 76, timing line 17*b* and the "one" output of trigger 38 via conductor 62*b***.

This arrangement allows digit signals stored in triggers 37 and 38 of TSL 30 to be transferred to the AND gates 66, 67, 68 and 69 of the corresponding inputs to storage triggers 71 and 72. Since the setting of trigger 92 activates line 76, the first timing pulse occurring thereafter gates the digit set stored in triggers 37 and 38 into triggers 71 and 72 of USL 60. The same timing pulse also activates AND 63, setting trigger 64, which turns off line 76, deconditioning AND gates 66, 67, 68 and 69 and providing an output signal on line 75.

Line 75 is connected to line 14' (not shown) of cell 2 which corresponds to line 14 of cell 1. This enables the next occurring timing pulse to gate the digit information stored in triggers 37 and 38 into the corresponding triggers of TSL 30' of cell 2 (FIG. 4). Subsequent timing pulses cause the above-described operations to occur in the same order in cell 2 and thereafter in cell 3, etc., thus carrying out the desired digit shifting and storing sequence.

Cross-multiplication circuit 120

As shown in FIG. *5a*, cross-multiplication circuit 120 includes AND circuits 123, 124, 125, 126, 127 and 128. A first OR circuit 131 permits the outputs from either of the AND circuits 123 or 124 to be passed onto output line 132. Similarly, an OR circuit 129 permits the outputs from either of the AND circuits 126 or 127 to be passed onto an output line 134. The other two cross-multiplication circuit output lines 133 and 135 are taken directly from the outputs of AND circuits 125 and 138, respectively.

The inputs to AND 123 are derived from the "one" output of TSL trigger 38 via line **62*b*, from the "one" output of TSL trigger 37 via line 61*b* and from output line 76 of AND 65 in USL 60. Thus, whenever "ones" are stored in both triggers 37 and 38 and line 76 is activated (signifying that valid digit sets—as opposed to digit sets left over from a previous operation—are stored in TSL 30 and LSL 90 but not in USL 60) a binary "one" signal representing a cross-product digit issues from the output of AND 123 and passes through OR 131 onto output line 132. This signal corresponds to the cross-product digit $a_{j+1}b_{j+1}$ of Equations 1 and 2, supra. If the digit set in triggers 37 and 38** is not 1, 1, then this cross-product digit signal is a "zero."

The inputs to AND 124 are derived from the "one" output of USL trigger 71, the "one" output of TSL trigger 38 and from the reset output of gating trigger 64 via line 78 and an inverter circuit 122. Thus, whenever "ones" are stored in triggers 38 and 71 and line 78 is not activated (signifying that a valid digit set is stored in USL 60) a "one" pulse issues from AND 124 and is passed by OR 131 onto output line 132. No pulse (indicative of a "zero") issues if "ones" are not stored in both triggers 38 and 71. The output from AND 124 corresponds to cross-product digit $a_{j+1}b_{i-1}$. It is to be noted that the presence of inverter 122 renders the outputs of AND's 123 and 124 mutually exclusive, permitting the use of a single output line 132.

The inputs to AND 125 are derived from inverter 122, the "one" output of trigger 37 and from the "one" output of trigger 72. Thus, when valid "ones" are stored in triggers 37 and 72, a digit signal issues from AND 125 onto output line 133. This digit signal corresponds to the cross-product digit $a_{i-1}b_{j+1}$.

The inputs to AND 126 are derived from the "one" output of trigger 38, the "one" output of trigger 37 and from line **105*a* which is connected to output line 105 of AND 93 in LSL 90. Thus, when a "one" is stored in both TSL triggers 37 and 38 and when AND 93 is activated (signifying that a valid digit set is stored in TSL 30 and that valid digit sets are stored in neither LSL 90 nor USL 60), a "one" signal issues from AND 126 and is passed through OR 129 onto output line 134**. This signal corresponds to the cross-product digit $a_jb_j$.

The inputs to AND 127 are derived from the "one" output of trigger 98, the "one" output of trigger 38 and from the reset output of trigger 92 via line 106 and inverter circuit 121. A "one" signal thereby issues from AND 127 whenever "ones" are stored in triggers 38 and 98 and line 106 is not activated (signifying the presence of a valid digit set in LSL 90). This digit signal corresponds to the cross-product digit $a_jb_i$. It is to be noted that due to the presence of inverter 121 the outputs of AND's 126 and 127 are mutually exclusive, permitting the use of a single output line 134.

The inputs to AND 128 are derived from inverter 121, the "one" output of trigger 37 and from the "one" output of trigger 99. An output pulse will issue from AND 128, therefore, whenever there are valid "ones" in both triggers 37 and 99. The output signal from AND 128 appears on cross-multiplier output line 135. This digit signal corresponds to the cross-product digit $a_ib_j$.

It is noted that a different one of the AND circuits 123, 124, 125, 126, 127 and 128 corresponds to each one of the six different cross-product digits called for by Equations 1 and 2 in the computation of the sum digit $S'_n$ and carry digits $C'_n$ to be stored during the following time interval in the sum digit storage circuit 230 and the carry digits storage circuit 210.

Sum digit computation circuit 180

As shown in FIG. 5*b*, the sum digit computation circuit 180 comprises a plurality of exclusive OR circuits 181, 182, 183, 184, 185, 186, 187 and 188. Exclusive OR circuits are well known in the digital computer art and include an arrangement of circuit elements that produces an output pulse when a pulse is present at only one of its two inputs. Circuit 180 performs the mathematical operations called for by Equation 1, supra, and produces an output signal on line 189 which represents the low order binary digit of the sum of (1) all cross-products generated during a given time interval in cell 1 and in the cell immediately to the left thereof which contribute to the same digit of the final product, (2) the carry digit signals generated in cell 1 during the preceding time interval, and (3) the sum digit signal generated in cell 2 during the preceding time interval.

Since the low order binary digit of the sum of any plurality of single digit binary inputs is simply the modulo 2 sum of "ones" in those inputs, the circuit 180 consists of a "tree" of exclusive OR circuits which produces a binary "one" at its output line 189 if the number of "one" signals at the inputs to the tree is odd and produces no output signal if the number of "ones" at its inputs is even. The inputs to circuit 180 which come from the outputs 228*a*, 228*b*, 228*c* and 228*d* from carry digit storage circuit 210, from the outputs 134 and 135, from cross-multiplication circuit 120 and from superfluous inputs 132*x* and 133*x*, are divided among exclusive OR circuits 181, 182, 183 and 184. The outputs from these four exclusive OR circuits serve as the inputs to exclusive OR's 185 and 186. The outputs from the latter two circuits serve as the inputs to exclusive OR circuit 187, while the output of circuit 187 and the input appearing on line 235' from sum digit storage circuit 230' of cell 2 serve as the inputs to the final exclusive OR 188, the output of which appears as the output of circuit 180 on line 189.

Sum digit storage circuit 230

As shown in FIG. 5*b*, sum digit storage circuit 230 comprises a trigger circuit 234 having a pair of AND gates 231 and 232 coupled to its inputs. The inputs to AND 231 are derived from output line 189 of circuit 180 and from timing line 17. The inputs to AND 232 come from an inverter 233 coupled to output line 189 and from timing line 17. Thus, a "one" signal appearing on line 189 causes the "one" side of trigger 235 to be set coincidentally with the occurrence of a timing pulse and no signal on line 189 causes the "zero" side of trigger 234 to be so set.

Carry digits computation circuit 150

As shown in FIG. 5*b*, the carry digits computation circuit 150 comprises a voltage adder circuit 151 the output 152 of which feeds, in parallel, a plurality of threshold circuits 153, 154, 155 and 156. This circuit combination performs the mathematical operations called for in Equation 2, supra. The inputs to the circuit 150 are the same as the inputs to the circuit 180, discussed above. The number of output lines 157*a*, 157*b*, 157*c* and 157*d* which have voltage levels corresponding to binary "ones" indicates the number of binary carries which must be stored for use in computing the next higher order sum and carry digits during the following time interval. As indicated in Equation 2, the number of carry digits is calculated by summing the indicated cross-product digits, subtracting from the total the sum digit computed in accordance with Equation 1 and dividing the difference by two.

FIGS. 6 and 7 show the circuit details of the voltage adder 151 and the threshold circuits. As seen in FIG. 6, voltage adder 151 comprises a voltage divider circuit having a number of equally weighted resistors *r* connected to a common bus 158, the latter being returned to ground through an appropriately weighted calibration resistor R. The input end of each of the resistors *r* is connected to one of the indicated circuit 150 input lines. Each of these lines is at either a first voltage level indicative of a binary "one" or a lower second voltage level (usually ground) indicative of a binary "zero." The voltage on common bus 158 will be substantially proportional to the number of "one" input signals.

An appropriate voltage amplifier 159 receives the voltage signal on bus 158 and increases it to a desired level, thereby providing an amplified output signal on line 152 to the various threshold circuits. For the purposes of the present discussion the gain of amplifier 159 is chosen so as to produce an output signal having an amplitude proportional in even one volt increments to the number of "one" inputs present at the voltage divider circuit. Thus, if five of the nine inputs to circuit 150 are indicative of binary "ones", the voltage level of the signal on line 152 is five volts.

A threshold circuit suitable for use for each of the four circuits 153, 154, 155 and 156 is shown in FIG. 7. There, a PNP transistor 161 has its collector connected through a bias resistor to a terminal 163 connected to a source of negative bias voltage. The emitter of the transistor is connected to a potentiometer 162, permitting adjustment of the emitter bias voltage. Thus, the control voltage applied to the transistor base through line 152 which is necessary to forward bias the base-emitter junction to initiate transistor conduction is a variable depending upon the setting of potentiometer 162. When transistor 161 becomes conducting, the voltage on output line 157*a* increases to a positive level.

For use as the circuit 153 of circuit 150, the potentiometer 162 is set to give the transistor 161 a conduction threshold of approximately 1.5 volts. The potentiometer of circuit 154 is set to provide its associated transistor with a 3.5 volt threshold. Likewise, the circuits 155 and 156 are adjusted for thresholds of 5.5 v. and 7.5 v., respectively.

Thus, if only a single or no binary "one" signal is present at the inputs of circuits 150, "zero" outputs will be present on all output lines 157*a*, 157*b*, 157*c* and 157*d*. If two or three "ones" are present at the inputs, a "one" signal is generated on output 157*a* and the other three outputs are "zero." If four or five "one" signals are present at the inputs, "one" outputs are present on lines 157*a* and 157*b* and the other two outptus are "zero". If six or seven "one" signals are present at the inputs, output lines 157*a*, 157*b* and 157*c* have "one" signals and 157*d* is "zero." If eight or nine "one" signals are present at the inputs, all four output lines have "one" signals thereon. The logical function thus performed by circuit 150 is in accord with Equation 2.

Carry digits storage circuit 210

As shown in FIG. 5*b*, the carry digits storage circuit 210 comprises four trigger circuits 224, 225, 226 and 227, having their inputs connected in pairs, respectively, to AND gates 215, 216, 217, 218, 219, 221, 222 and 223. One of the inputs of each of the AND gates is derived from timing line 17 while the second input of each of the AND gates associated with a "one" trigger input is connected directly to one of the output lines from circuit 150. The second input of each of the AND gates associated with a "zero" trigger input is derived from the same source through one of the inverter circuits 211, 212, 213, and 214. Thus, each timing pulse causes the digit signals present on output lines 157*a*, 157*b*, 157*c* and 157*d* to be transferred to and stored in, respectively, the triggers 224, 225, 226 and 227.

Unit-delay embodiment—Operation

The operation of the unit-delay embodiment is hereinafter described with reference to the waveform diagram of FIG. 8, the detailed circuits schematics of FIGS. 5*a* and 5*b* and the schematic computaiton diagrams of FIGS. 9*a*–9*i*. In FIG. 8, the waveforms A and B represent, respectively, operand *b* signals appearing on input lines 10*a* and 10*b* of cell 1. Waveforms C and D are operand *a* signals appearing, respectively, on the input lines 12*a* and 12*b*. Waveforms A and B represent, during the initial four time intervals, the digit values 1011, the low order digit occurring first in time. Waveforms C and D represent the digit values 1101, also occurring during the initial four times intervals low order digit first. Waveform E represents the multiplier output signal occurring on line 235. Waveform T represents the timing pulses supplied to timing lines 17, 17*a* and 17*b* by the main timing bus 16.

Each of the diagrams in FIGS. 9*a* through 9*i* represent the status of the multiplier at the end of a designated time interval. The double-arrow brackets with the TSL, USL and LSL of each of the cells are intended to represent the capacity of the cross-multiplication circuit in the cell for taking the six cross-products required in Equations 1 and 2. The arrow connecting each of the brackets to a computation circuit indicates the capacity for transmission of the cross-product digit to the indicated computation circuit. The arrows extending from the computation circuits 150–180, etc., represent the capacity of the circuit for transferring sum and carry digit signals to the inputs of storage circuits 230 and 210, etc. The arrows out of each of the sum and carry digit storage circuits represent the capacity of those circuits to transmit digit signals to the various locations indicated by the arrows. The parallel arrows into and out of each of the transient strogae locations represents the capacity of the circuits for entering digit sets into and transferring digit sets out of each cell. The darkened lines represent operations actually occurring during the indicated time interval.

Figure 9A:
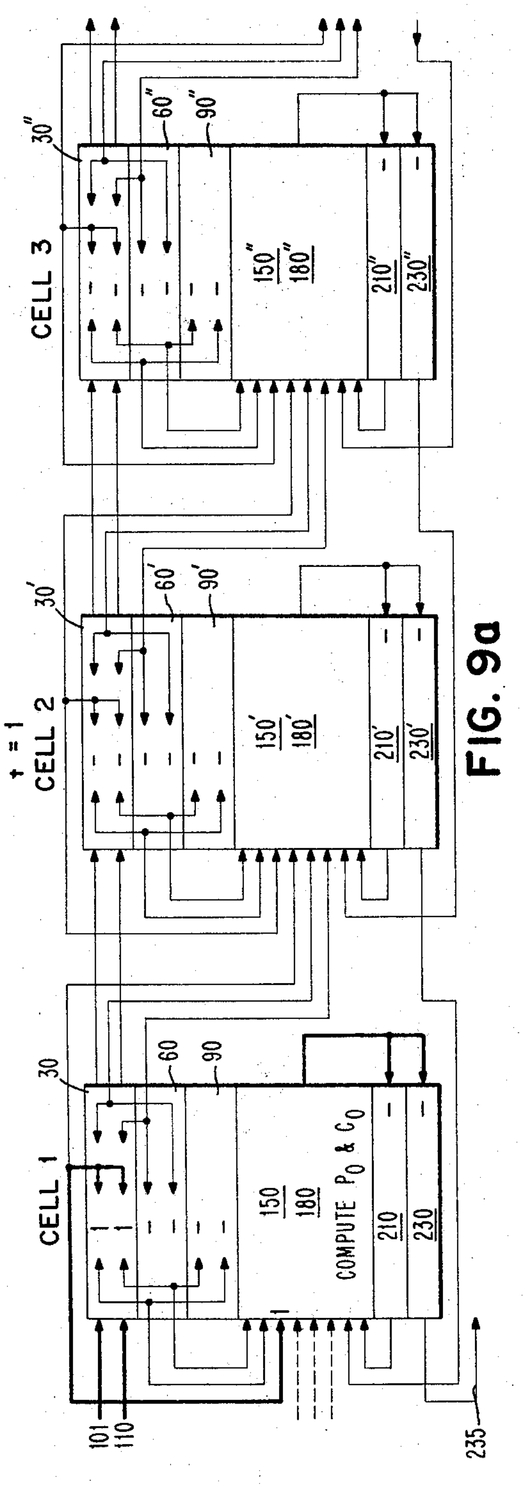

Looking now at FIG. 9*a* with secondary reference to FIGS. 5*a*, 5*b* and 8, the operations, as indicated by the darkened arrows, performed in the multiplier during the first time interval are described. Timing pulse T1, in conjunction with a master "on" signal on line 14, gates the binary "one" signals on lines 10*b* and 12*b* through AND circuits 34 and 36, storing binary "ones" in TSL triggers 37 and 38. Timing pulse T1 also activates AND 31 and sets gating trigger 32.

A short time later when the outputs of triggers 37 and 38 have settled, AND 126 emits a "one" pulse, which appears as an input on line 134 to the computation circuits 150 and 180. In the former, no threshold circuits are triggered and thus the carry digit signals appearing at the inputs to carry digit storage circuit 210 at the end of the first time interval are all "zeros." In circuit 180 the single input pulse on line 134 causes signals to issue from exclusive OR circuits 181, 185, 187 and 188, thus causing a binary "one" signal to be present at the input to sum digit storage circuit 230 at the end of the first time interval.

Figure 9B:
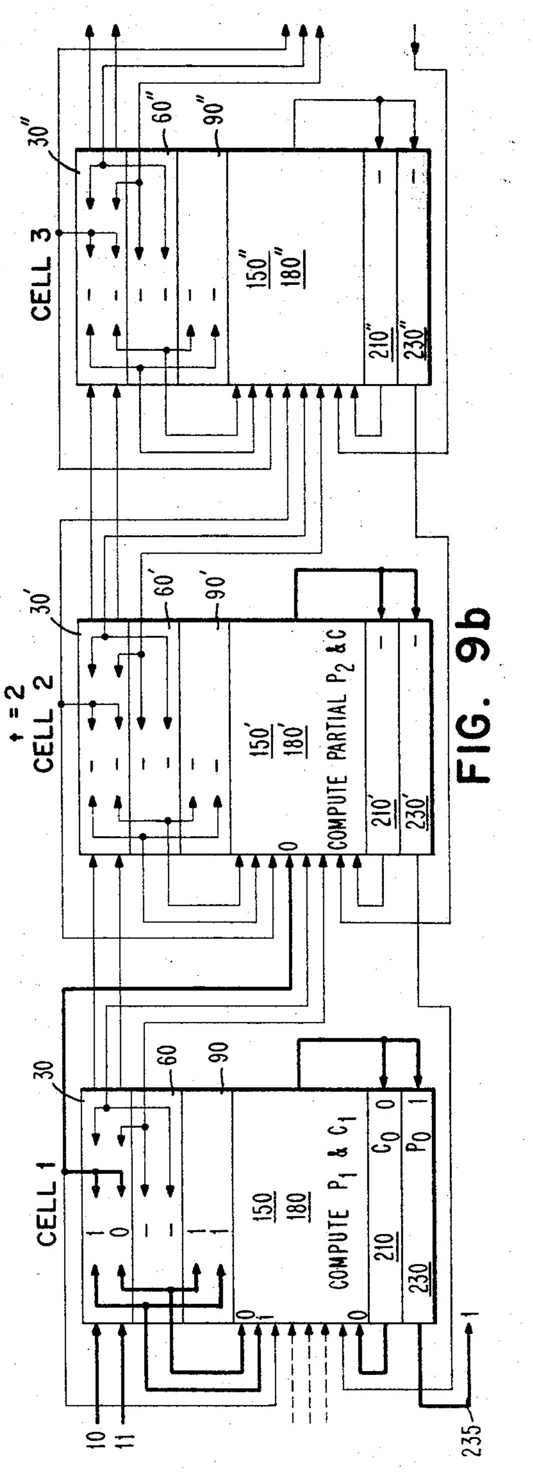

As shown in FIG. 9*b*, timing pulse T2 causes transfer of the first order digit set from TSL 30 to LSL 90 and enters the second order digit set, consisting of a *b* operand of "one" and an *a* operand of "zero," into TSL 30. At the same time, pulse T2 gates the "zero" signals remaining on lines 157*a*, 157*b*, 157*c* and 157*d* from the preceding time interval into the triggers 224, 225, 226, and 227 of carry digit storage circuit 210. Similarly, the binary "one" present on line 189 of circuit 180 at the close of the preceding time interval is gated into trigger 234, thus rendering the first multiplier output digit, $P_0$, available on line 235.

As soon as the digits shifted into the triggers 37, 38, 98 and 99 switch the outputs thereof, AND circuits 123, 127 and 128 are conditioned to generate cross-product digits. AND 123 produces a "zero" cross-product digit which is transferred to the inputs of computation circuits 150′ and 180′ of cell 2 via line 132. AND 127 similarly emits a "zero" pulse via line 134 to the inputs of circuits 150 and 180, while AND 128 transfers a "one" pulse to the inputs of the same circuits via line 135.

Since the total number of "one" inputs to the circuits 150 and 180 is one, just as during the preceding time interval, the condition of output lines 157*a*, 157*b*, 157*c* and 157*d* of circuit 150 and line 189 of circuit 180 does not change. The corresponding output lines in cell 2 all represent "zeros" since no "one" signals appear at the inputs of circuits 150′ and 180′.

Figure 9C:
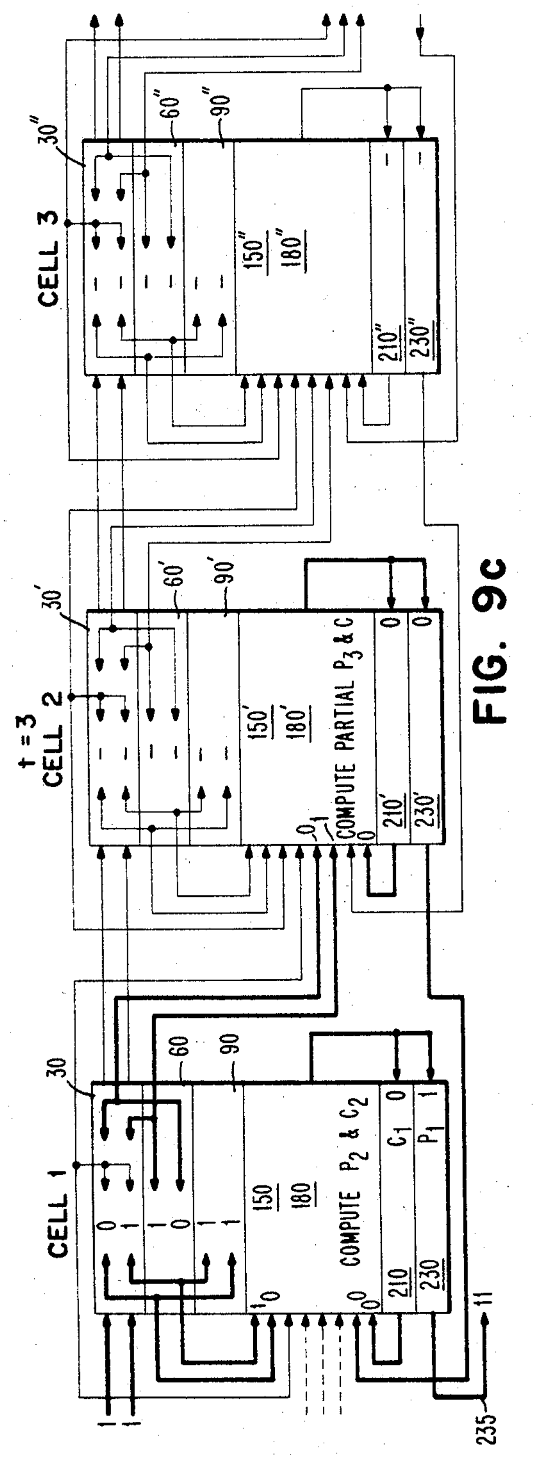

During the third time interval, as shown in FIG. 9*c*, timing pulse T3 shifts the third order digit set into TSL 30 and the second order digit set from TSL 30 to USL 60. T3 also gates the sum and carry digits computed during the preceding time interval in the circuits 180 and 150 into storage circuits 230 and 210, respectively, and further gates the sum and carry digits computed during the preceding time interval in the circuits 180′ and 150′ into the storage circuits 230′ and 210′, respectively. The second multiplier output digit, $P_1$, becomes available on line 235.

As soon as the outputs of triggers 37, 38, 71 and 72 settle (the outputs of triggers 98 and 99 were not changed), AND circuits 124, 125, 127 and 128 emit cross-product digits on lines 132, 133, 134 and 135, respectively. AND's 124 and 127 generate "one" signals and AND's 125 and 128 generate "zeros." This places a single "one" signal at the inputs to all computations circuits 150, 180, 150′ and 180′, and as a result, the outputs from these circuits remain the same as they were during the preceding time interval, except for output line 189′ of circuit 180′, which changes to represent a binary "one."

Figure 9D:
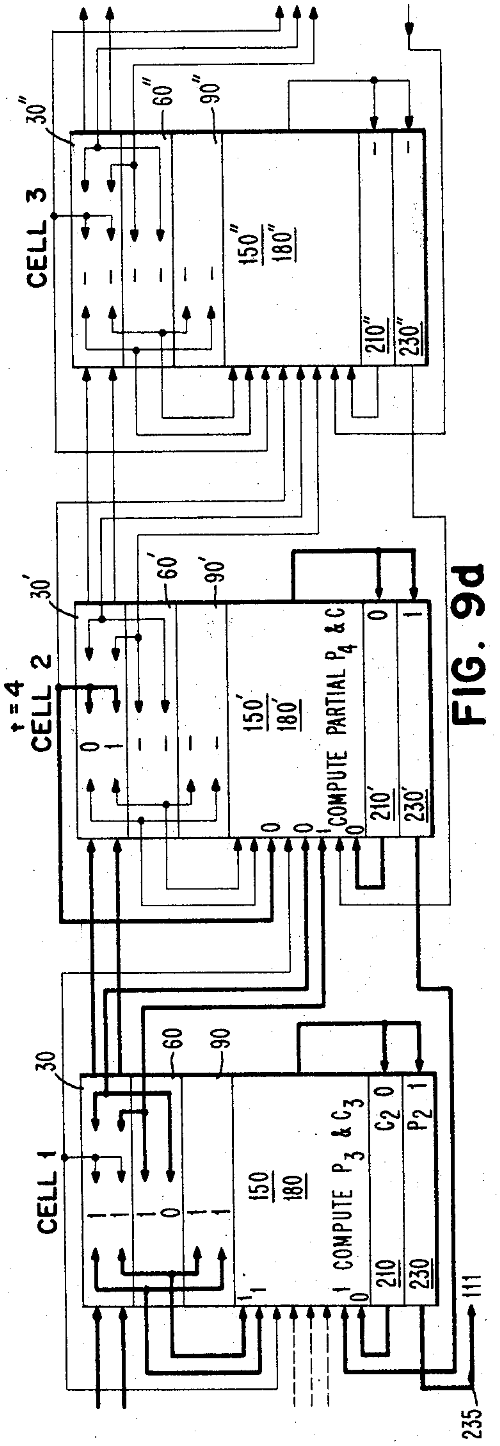
Figure 9E:
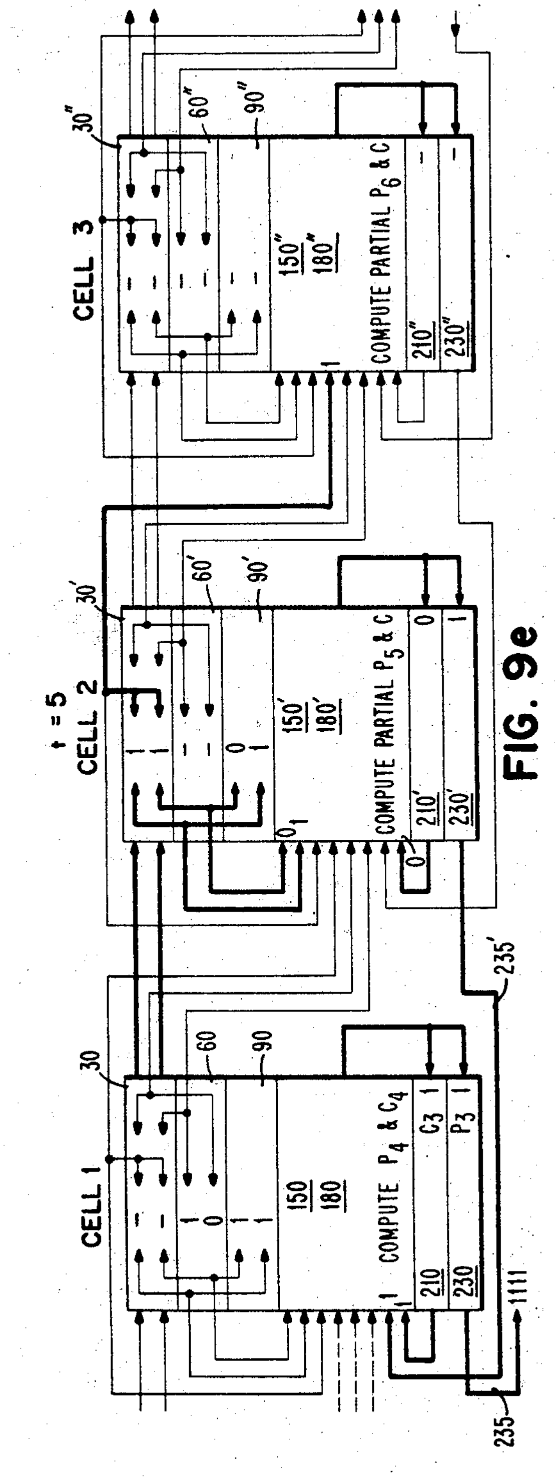
Figure 9F:
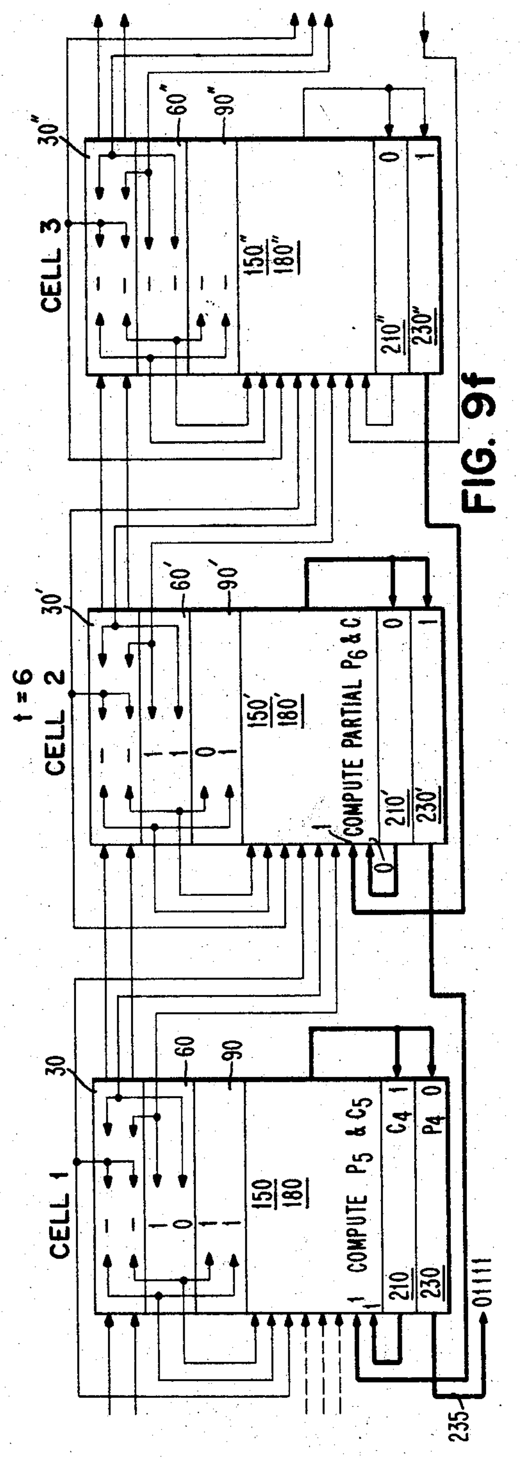
Figure 9G:
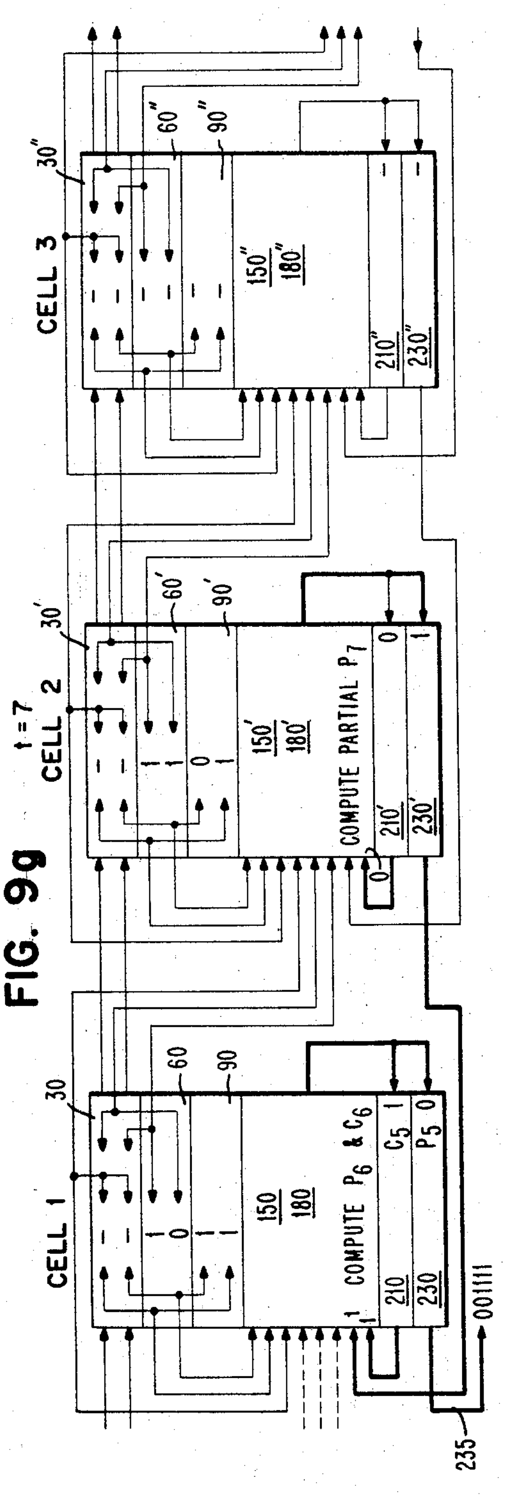
Figure 9H:
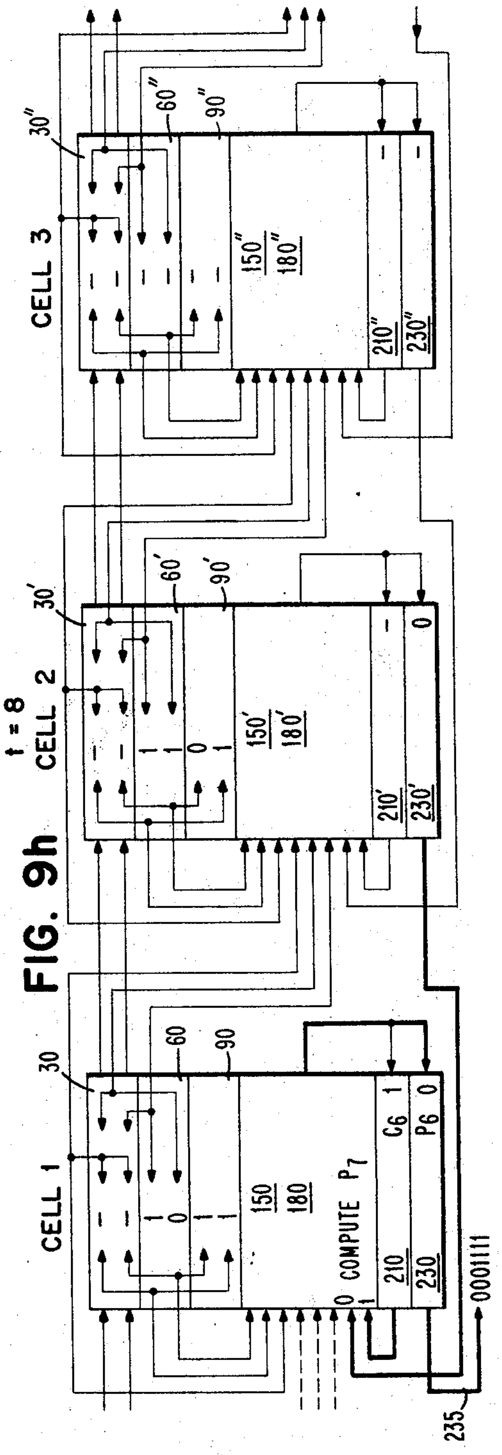
Figure 9I:
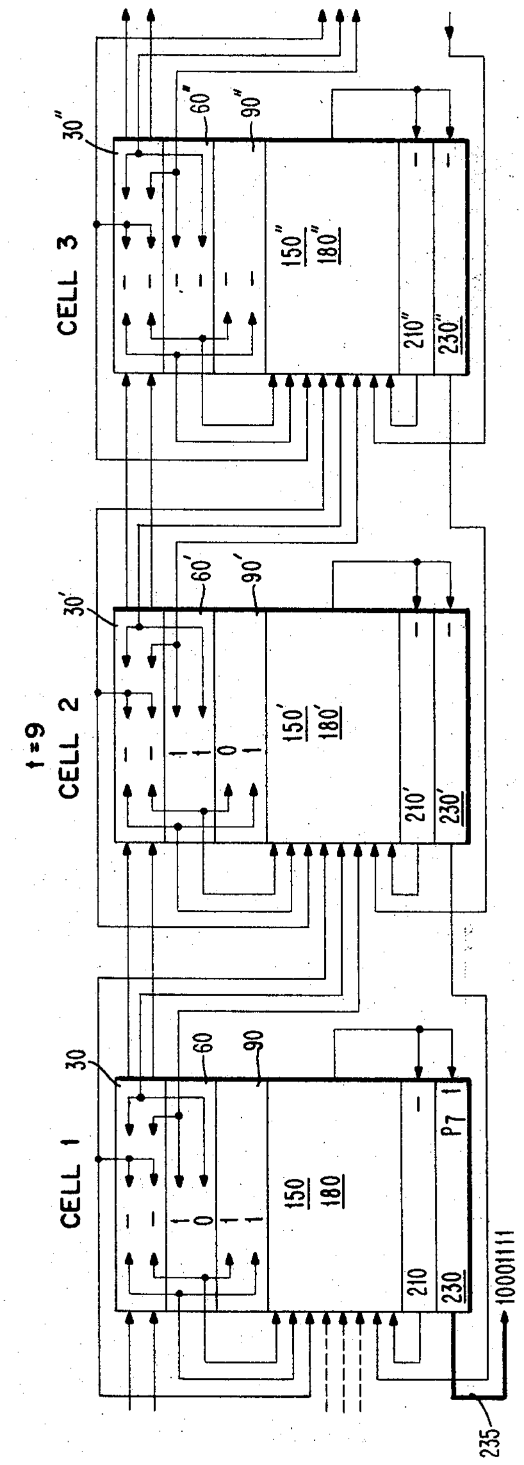

During the fourth time interval, FIG. 9*d*, the third order digit set is shifted from TSL 30 to TSL 30′ and the fourth (and final) order digit set is shifted into TSL 30. Sum and carry digits $P_2$ and $C_2$ are shifted into circuits 230 and 210 while the partial $P_3$ sum digit and intermediate carry digits computed in circuits 180′ and 150′ during the third time interval are shifted into storage circuits 230′ and 210′, respectively. The pattern (but not the value) of cross-product digits generated in cell 1 is the same as for the preceding time interval, i.e., the cross-product digits issue from AND circuits 124, 125, 127 and 128. It is noted that this pattern remains the same for all subsequent time intervals, so long as new digit sets keep appearing in TSL 30. It is also noted that at this point the cross-product digit generation sequence being initiated in cell 2 is the same as was begun in cell 1 during the first time interval. Cell 2 thus begins to exactly duplicate the operational steps described above for cell 1.

During this time interval, circuits 150–180 of cell 1 compute $P_3$ and $C_3$ while the circuits 150′–180′ of cell 2 compute a partial sum digit for $P_4$ and an intermediate carry C. Three of the four inputs to circuits 150–180 are "ones" so that the outputs of both circuits are "ones." Only a single "one" is presented to circuits 150′–180′, thus at the end of the fourth time interval circuit 180′ presents a "one" to the input of circuit 230′ and the circuit 150′ presents all "zeros" to the inputs of circuit 210′.

Upon the occurrence T5 at the beginning of the fifth time interval, the fourth order digit set is shifted from TSL 30 to TSL 30′ and the third order digit set is shifted from TSL 30′ to LSL 90′. Three cross-product digits are generated in cell 2 and distributed to the circuits 150′–180′ and 150″–180″ to enable the computation, in cell 2, of a sum digit representing a partial accumulation of product digit $P_5$ and in cell 3 of a sum digit representative of a partial accumulation of $P_6$. In cell 1, no cross-product digits are generated since no new digit set is entered into TSL 30. The only inputs to circuits 150–180 are from storage circuits 230′ and 210. Since these inputs are both "ones" a sum digit of "zero" representing product digit $P_4$ is generated in circuit 180 and a single carry digit representing $C_4$ is generated on output line *157a* and presented to the input of storage circuit 210.

During the sixth time interval product and carry digits $P_4$ and $C_4$ are shifted into storage circuits 230 and 210, respectively, and partial sum digits $P_5$ and $P_6$ are shifted into sum digit storage circuits 230′ and 230″, respectively. No cross-product digits are generated in any cell since all transient storage locations are empty.

During the seventh, eighth and ninth time intervals, product digits $P_5$, $P_6$ and $P_7$ are sequentially made available on output line 235 as the product digit accumulation proceeds. Thus, after nine time intervals the eight digits of the product 1000111 have been sequentially generated. This output appears as the waveform E of FIG. 8. As is noted, the first digit of the output does not appear until the second time interval, hence the term unit-delay embodiment.

To enable the multiplier to handle larger operands it is necessary only to add the desired number of additional cells onto the right-hand end of the chain. As can be seen, the number of cells necessary in any unit-delay multiplier in accordance with the invention must be equal to at least half the number of digits in the largest expected operand plus one.

No-delay embodiment—General

In the unit-delay embodiment the first digit of the product does not appear on output line 235 (FIG. *5b*) until the beginning of the second time interval at $t=1$. This is indicated by the initial rise in waveform E of FIG. 8. The reason for this interval of delay lies in the fact that the TSL 30 triggers 37 and 38 have to switch before the first digits of the operand are made available to cross-multiplication circuit 120 and the sum digit storage trigger 234 has to switch before the output digit formed from the first operand digits appears on line 235. Since the triggers 37, 38 and 234 all switch at the same time, the first product digit, and all subsequent product digits, cannot be present on output line 189 of circuit 180 in time to affect the switching of trigger 234 until the beginning of the time interval following that during which they are formed.

The no-delay embodiment hereinafter described eliminates this period of delay by bypassing the storage triggers of the TSL of the initial cell at the appropriate times, by eliminating the sum digit storage circuit of the initial cell and by altering the pattern in which the product digits are accumulated throughout the multiplier as a whole. The result of these changes is to shift the output digit signals forward in time by one time interval as shown by waveform F of FIG. 8.

As is apparent from the previous description of the unit-delay embodiment, the cross-product digits formed in each cell during each time interval contribute to two adjacent product digits. For example, as seen in FIG. *9c* at $t=3$, the cross-product digits formed in cell 1 are the result of cross-multiplication of the first order digit set located in LSL 90 by the third order digit set located in TSL 30 and of cross multiplication of the second order digit set located in USL 60 by the third order digit set located in TSL 30. The cross-product digits resulting from the former cross-multiplication operation contribute to the third product digit, $P_2$, and the cross-product digits from the latter cross-multiplication operation contribute to the adjacent product digit, $P_3$. Also apparent from FIG. *9c* is that in a cell of the unit-delay embodiment those cross-product digits formed during a given time interval which contribute to the lower order product digit are utilized in the computation circuits of the same cell while the cross-product digits formed which contribute to the higher order product digit are transferred to the adjacent right-hand cell to be accumulated in the computation circuits thereof.

This digit accumulation pattern must be shifted forward in the no-delay embodiment in order to compensate for the time interval elimination. That is to say, in the no-delay embodiment the cross-product digits generated in a cell during a given time interval which contribute to the lower order digit of the product of the two then having cross-product digits generated in the cell are transferred to the adjacent left-hand cell for utilization in the computation circuits thereof while the cross-product digits contributing to the higher order product digit are utilized in the computation circuits of the same cell. This shift in the digit accumulation pattern represents the only difference between a general cell of the no-delay embodiment and a cell of the unit-delay embodiment. All cells of the no-delay embodiment, except the first cell thereof, are identical and are herein referred to as "general cells."

This difference is expressed, with reference to FIG. 10, by the following mathematical expressions, which denote the manner in which the digit values $S_n$ and $C_n$ are calculated in a general cell $n$ during a given time interval. As with the previous Equations 1 and 2, the expressions have particular application to a system wherein all digit values are represented in binary notation. The following apply to all general cells of the no-delay embodiment.

For cell $n$:

$$E'_n=a_k b_k u_n+(a_{i+1}b_k+a_k b_{i+1})(1-u_n)+a_{k-1}b_{k-1}v_{n+1} +(a_{i+2}b_{k-1}+a_{k-1}b_{i+2})(1-v_{n+1})+C_n+S_{n+1}$$

$$S'=E'_n \text{ Mod } 2 \quad (3)$$

$$C'_n=\tfrac{1}{2}(E'_n-S'_n) \quad (4)$$

where:

$u_n=1$ if LSL of cell $n$ is filled and USL of same cell is empty and is 0 otherwise;

$v_{n+1}=1$ if both LSL and USL of cell $n$ are filled and LSL of cell $n+1$ is empty and is 0 otherwise.

The intial cell must have no triggers in the circuits which compute the first product digit from the incoming first order digit set and which thereafter compute cross-product digits from each subsequent incoming digit set if the appearance of the first product digit and each product digit thereafter is to substantially coincide with the appearance of the first operand digit set and each digit set thereafter. This requires elimination of the sum digit storage circuit from the initial cell and further requires that appropriate circuits be provided in order to permit instantaneous utilization in the computation circuits of the initial cell of the digit signals of each incoming digit set as they are presented to the inputs of the triggers of the TSL of cell 1. Another way of expressing this unique characteristic of cell 1 is as follows: The computation of the product bit in the first cell depends not only upon digits which were previously stored in the triggers of the first cell and which are available at the outputs of these triggers but upon the incoming digit set which is present on the input lines. These signals are processed through the combinational logic elements (which have no triggers) of the computation circuits of the first cell and the product bit is available delayed from the initial appearance of the input line signals by an amount of time determined by the delays through the combinational logic elements. These delays are considered to be very small compared to the clock period and the trigger switching time; and thus on this time scale, the output may be said to be coincident with the input. The output product bit is available only while the input is present.

The operation of the circuits of the initial cell is graphically illustrated in FIG. 10 where double arrow brackets are drawn between the incoming digit set $a_{j+1}b_{j+1}$ and the various digit sets within cell 1 by which, at selected times, the incoming digit set is cross-multiplied. Owing to this situation, it may be said that the TSL of the initial cell of the present embodiment "stores" two digit sets, the digit set actually stored in the TSL triggers and the incoming digit set being presented at the inputs of these triggers. The latter digit set is "stored" in the sense that due to the normal pulse duration of the signals the presence of the digit set is maintained on the input conductors for a finite period of time.

The mathematical expression denoting the digit values $S_1$ and $C_1$ which are calculated and stored in cell 1 each time interval (and which are equivalent to the product and carry digits P and C of FIG. 1) are hereinafter given in connection with FIG. 10. As before, the expressions have particular application to a system wherein all digit values are represented in binary notation.

For cell 1:

$$E'_1=a_{j+1}b_{j+1}w+(a_{j+1}b_j+a_jb_{j+1})x+(a_{j+1}b_0+a_0b_{j+1})(1-x)(1-w)+a_jb_ju_1+(a_jb_1+a_1b_j)(1-x)(1-w)(1-u_1)+a_{j-1}b_{j-1}z_2+(a_2b_{j-1}+a_{j-1}b_2)(1-x)(1-w)(1-u_1)(1-v_2)(1-z_2)$$

$$S'_1=E'_1\text{Mod }2 \quad (5)$$

$$C'_1=\tfrac{1}{2}(E'_1-S'_1) \quad (6)$$

where:

$w=1$ if TSL and LSL of cell 1 are empty and is 0 otherwise;

$x=1$ if TSL of cell 1 is filled and LSL of same cell is empty and is 0 otherwise;

$u_1=1$ if LSL of cell 1 is filled and USL of same cell is empty and is 0 otherwise;

$v_2=1$ if USL of cell 1 is filled and TSL of cell 2 is empty and is 0 otherwise;

$z_2=1$ if TSL of cell 2 is filled and LSL of cell 2 is empty and is 0 otherwise.

FIG. 11 schematically illustrates a three cell no-delay multiplier in accordance with the present invention. Cell 1 includes TSL 330, USL 360, LSL 390, cross-multiplication circuit 420, carry digits and sum digit computation circuits 450 and 480 and a carry digits storage circuit 510. It will be noted that the final output is taken on line 535 directly from the output of computation circuit 480, there being no sum digit storage circuit in accord with the above discussed principles. Cross-multiplication circuit 420 receives inputs from the output lines 361, 362, 373, 374, 401 and 402 of the three storage circuits 330, 360 and 390, respectively, and in addition receives inputs directly from multiplier input lines 310 and 312 via lines 358 and 359.

General cell 2 includes TSL 330', USL 360', LSL 390', cross-multiplication circuit 420', carry digits and sum digit computation circuits 450' and 480', carry digits storage circuit 510' and sum digit storage circuit 530'. Comparison of this cell with a unit-delay cell of FIG. 4 illustrates their similarity. The only difference, as previously mentioned and as will be subsequently discussed in detail, lies in the arrangement of the cross-product digit transfer circuits extending from the cross-multiplication circuits. General cell 3 and all cells which may be connected thereto are identical to cell 2.

No-delay embodiment.—Detailed description of general cell

With reference to FIGS. 12*a* and 12*b*, a detailed description of a general cell of the multiplier of FIG. 11 is hereinafter given. The description is specifically directed to cell 2.

Referring to FIG. 12*a*, TSL 330', USL 360', LSL 390' and cross-multiplication circuit 420' are all constructed identically to corresponding circuits TSL 30, USL 60, LSL 90 and cross-multiplication circuit 120 of the unit-delay embodiment previously described in detail in connection with FIG. 5*a*. Of course, the inputs to TSL 330' are obtained on lines **339*a*, 339*b*, and 340*a*, 340*b* from the TSL storage triggers of the initial cell rather than from the multiplier input itself. Similarly, input line 375** of FIG. 12*a*, corresponding to line 14 of FIG. 5*a*, is connected to a gating trigger in the initial cell rather than to a master on-off control switch. Output lines **339*a'*, 339*b'* and 340*a'*, 340*b'* of the storage triggers of TSL 330' connect with the inputs to TSL 330'' of cell 3**.

As shown in FIG. 12*b*, the carry digits computation circuit 450', sum digit computation circuit 480', carry digits storage circuit 510' and sum digit storage circuit 530' are all constructed identically to the corresponding circuits 150, 180, 210 and 230 of the unit-delay embodiment cell previously described in detail in connection with FIG. 5*b*.

As previously stated, the only difference between a general cell of the present embodiment and a cell of the unit-delay embodiment is the manner in which the output lines from the cross-multiplication circuits are connected to the computation circuits. As shown in FIG. 12*b*, output line 432', on which appear the mutually exclusive cross-product digits $a_kb_k$ and $a_kb_{i+1}$ in accord with Equations 3 and 4, supra, and output line 433', on which appears cross-product digit $a_{i+1}b_k$ in accord with the same equations, are connected to the inputs of computation circuits 450' and 480'. Output line 434', on which appear the mutually exclusive cross-product signals $a_{k-1}b_{k-1}$ and $a_{k-1}b_{i+2}$ in accord with Equations 3 and 4, and output line 435', on which appears the cross-product signal $a_{i+2}b_{k-1}$ in accord with the same equations, are connected to the computation circuits 450 and 480 of the initial cell to the left.

No-delay embodiment.—Detailed description of initial cell

Referring to FIGS. 13*a* and 13*b*, taken together, a detailed description is hereinafter given of each of the circuits of cell 1 of FIG. 11.

TSL 330, LSL 390 and USL 360

As shown in FIG. 13*a*, TSL 330 includes a pair of binary trigger circuits 337 and 338 having inputs derived, respectively, from four AND gates 333, 334 and 335, 336. TSL 330 further includes a gating trigger 332 having its set input connected to timing line 317 which is in turn connected to main timing bus 316. The set input to trigger 332 could just as well have been connected to a source of switching potential through a master on-off switch as was done in the case of the corresponding gating trigger 32 of the first cell in the unit-delay embodiment. Trigger 332 operates with gating triggers in USL 360 and LSL 390 in the same manner that the corresponding gating triggers of the unit-delay embodiment operate together to control the sequence in which the incoming digit sets are shifted through and stored in the initial cell.

LSL 390 comprises a pair of trigger circuits 398 and 399 in combination with a set of input AND gates 394, 395, 396 and 397. LSL 390 further includes an AND circuit 393, a gating trigger 392 having its reset output connected to an input of AND 393 and an AND circuit 391 having its output connected to the set input of trigger 392. The circuit arrangement thus described is identical in structure and operation to the analogous circuit LSL 90 of the unit-delay embodiment, previously described in connection with FIG. 5*a*.

USL 360 comprises a pair of trigger circuits 371 and 372 having input AND gates 366, 367, 368 and 369. USL 360 further includes AND gate 365, gating trigger 364 having its reset output connected to an input of AND 365 and an AND circuit 363 having its output connected to the set input of trigger 364. The circuit arrangement thus described is identical in structure and operation to the analogous circuit USL 60 of the unit-delay embodiment, previously described in detail in connection with FIG. 5*a*.

Cross-multiplication circuit 420

As shown in FIG. 13*a*, cross-multiplication circuit 420 includes AND circuits 423, 424, 425, 436, 437, 438, 439 and 441. A first OR circuit 431 permits the outputs from either of AND circuits 423 or 424 to be passed onto output line 432. Similarly, a second OR circuit 442 gates the outputs from either of AND circuits 436, 437 or 438 onto an output line 434. In like manner, a third OR circuit 443 permits the outputs from either of AND circuits 439 or 441 to be passed onto output line 435.

The inputs to AND 423 are derived from the "one" output of TSL trigger 338, from the "one" output of TSL trigger 337 and from output line 376 of AND 365 in USL 360. Thus, whenever "ones" are stored in both triggers 337 and 338 and line 376 is activated (signifying that valid digit sets are stored in TSL 330 and LSL 390 but not in USL 360), a binary "one" signal representing a cross-product digit issues from the output of AND 423 and passes through OR 431 onto output line 432. This signal corresponds to the cross-product digit $a_jb_j$ of Equations 5 and 6, supra. If the digit set in triggers 337 and 338 is not 1, 1, then no pulse issues from AND 423 and this cross-product digit is a "zero."

The inputs to AND 424 are derived from the "one" output of USL trigger 371, from the "one" output of TSL trigger 338 and from the reset output of gating trigger 364 of USL 360 via line 378 and an inverter circuit 422. Thus, whenever "ones" are stored in triggers 338 and 371 and line 378 is not activated (signifying that a valid digit set is stored in USL 360) a "one" pulse issues from AND 424 and is passed by OR 431 onto output line 432. No pulse (indicative of a "zero") issues if "ones" are not stored in both triggers 338 and 371. The output from AND 424 corresponds to the cross-product digit $a_jb_1$. It is to be noted that the presence of inverter 422 renders the outputs of AND's 423 and 424 mutually exclusive, permitting the use of single output line 432.

The inputs to AND 425 are derived from inverter 422, from the "one" output of trigger 337 and from the "one" output of trigger 372. Thus, when valid digits are stored in triggers 337, and 372, a digit signal issues from AND 425 onto output line 133. This digit signal corresponds to the cross-product digit $a_1b_j$.

The inputs to AND 436 are derived from the *a* operand "one" input line **312*b* via line 358**, from the *b* operand "one" input line **310*b* via line 359 and from the reset output of gating trigger 332 in TSL 330 via line 342. Thus, when a digit set is first presented to the inputs of TSL 330 and trigger 332 is in its reset state (signifying that valid digit sets are not stored in any storage location of the multiplier) a digit signal issues from AND 436 onto output line 434**. This digit signal corresponds to the cross-product digit $a_{j+1}b_{j+1}$.

The inputs to AND 437 are derived from the output of AND 393, from a operand "one" input line **312*b* via line 358 and from the "one" output of trigger 337. Thus, whenever a valid digit set is stored in TSL 330 and no valid digit sets are stored in either LSL 390 or USL 360, AND 437 issues a digit signal which is passed through OR 442 onto output line 434**. This signal corresponds to the cross-product digit $a_{j+1}b_j$.

The inputs to AND 438 are derived from the *b* operand "one" input line **310*b* via line 359, from the "one" output of LSL trigger 399 and from the reset output of gating trigger 392 via an inverter circuit 421. AND 438 therefore issues a digit signal onto output line 434 whenever a digit set is presented at the multiplier input and a valid digit set is present in LSL 390**. This digit signal corresponds to the cross-product digit $a_0b_{j+1}$.

The inputs to AND 439 are derived from the output of AND 393 in LSL 390, from the *b* operand "one" input line **310*b* via line 359 and from the "one" output of TSL trigger 338. Thus, whenever a digit set is presented to the multiplier input and a valid digit set appears only in TSL 330 a digit signal issues from AND 439 and passes onto output line 435 through OR 443**. This signal corresponds to the cross-product digit $a_jb_{j+1}$.

The inputs to AND 441 are derived from a operand "one" input line **312*b* via line 358, from the "one" output of LSL trigger 398 and from inverter 421. Thus, whenever a valid digit set is stored in LSL 390 and a digit set is presented at the multiplier input, AND 441 isues a digit signal onto output line 435 through OR 443**. This signal corresponds to the cross-product digit $a_{j+1}b_0$.

Sum and carry digits computation circuits 480 and 450

As shown in FIG. 13*b* sum digit computation circuit 480 comprises exclusive OR circuits 481, 482, 483, 484, 485, 486, 487, 488, 489, 491, 492 and 493. Circuit 480 performs the mathematical operations called for by Equation 5, supra, and produces an output signal on multiplier output line 535 which represents the low order binary digit of the sum of (1) all cross-products genearted during a given time interval in cell 1 and in the cell immediately to the right thereof which contribute to the same digit of the final product, (2) the carry digits generated in cell 1 during the preceding time interval, and (3) the sum digit generated in cell 2 during the preceding time interval. This signal is representative of the modulo 2 sum of the number of "ones" in the stated inputs, as previously explained with regard to the sum digit computation circuit 180 of the unit-delay embodiment in connection with FIG. 5*b*. The signal on line 535 represents the product digit output of the multiplier.

The carry digits computation circuit 450 includes voltage adder 451 and threshold circuits 453, 454, 455, 456, 457 and 458. This circuit is analogous to the carry digits computation circuit 150 of the unit-delay embodiment, previously described in detail with regard to FIGS. 5*b*, 6 and 7, the only difference being that the voltage divider circuit of adder 451 includes four additional resistors *r* in addition to those shown in FIG. 6 in order to accommodate the four additional inputs to circuit 451. These four inputs also require two additional threshold circuits 457 and 458 to handle the maximum number of carry digits that can be generated during a given time interval. Threshold circuits 453, 454, 455 and 456 are identical to corresponding circuits 153, 154, 155 and 156 of the unit-delay embodiment circuit 150, previously described in detail in connection with FIG. 7. Additional threshold circuits 457 and 458 are similarly constructed but have their respective potentiometers adjusted to provide threshold levels at 9.5 and 11.5 volts, respectively. The logical function thus performed by circuit 450 is in accord with Equation 6 and is exactly analogous to the relation between circuit 150 and Equation 2, previously discussed in detail.

Carry digits storage circuit 510

As shown in FIG. 13*b*, carry digits storage circuit 510 comprises six triggers 524, 525, 526, 527, 507 and 508, having their inputs connected in pairs, respectively, to AND gates 515, 516, 517, 518, 519, 521, 522, 523, 503, 504, 505 and 506. One of the inputs of each of the AND gates is derived from timing line 317 while the second input of each of the AND gates associated with a "one" trigger input is connected directly to one of the output lines **457*a*, 457*b*, 457*c*, 457*d*, 457*e* and 457*f* of circuit 450. The second input to each of the AND gates associated with a "zero" trigger input is derived from the same source through one of the inverter circuits 511, 512, 513, 514, 501 and 502. Thus, as with the previously described carry digits storage circuit 210 of the unit-delay embodiment, each timing pulse causes the digit signals present on the output lines from circuit 450** to be transferred to and stored in the associated one of the storage triggers.

No-delay embodiment—Operation

With reference now to FIGS. 8, 13*a*, 13*b* and 14*a*–14*b*, the operation of the no-delay embodiment of the present invention is described.

Each of the diagrams in FIGS. 14*a* through 14*h* represent the status of the multiplier at a designated instant of time (the beginning of each time interval) noted at the top of each figure. The double-arrow brackets within the TSL, USL and LSL of each of the cells are intended to represent the capacity of the cross-multiplication circuit in the cell for taking the various cross-products required by Equations 3 and 4 (for cells 2 and 3) and Equations 5 and 6 (for cell 1). The arrow connecting each of the brackets to the computation circuits 450–480, etc., indicates the capacity for transmission of the various cross-product digits to the indicated computation circuits. The arrows extending from the computation circuits represent the capacity of the circuit for transferring sum and carry digit signals to the inputs of the storage circuits 510, 510′, 530′, etc. The arrows out of each of the sum and carry digit storage circuits represent the capacity of those circuits for transmitting digit signals to the various locations indicated by the arrows. The parallel arrows into and out of each of the transient storage locations represent the capacity of the circuit for entering digit sets into and transferring digit sets out of each cell. The darkened lines represent operations actually occurring at or just before the time shown.

Figure 14A:
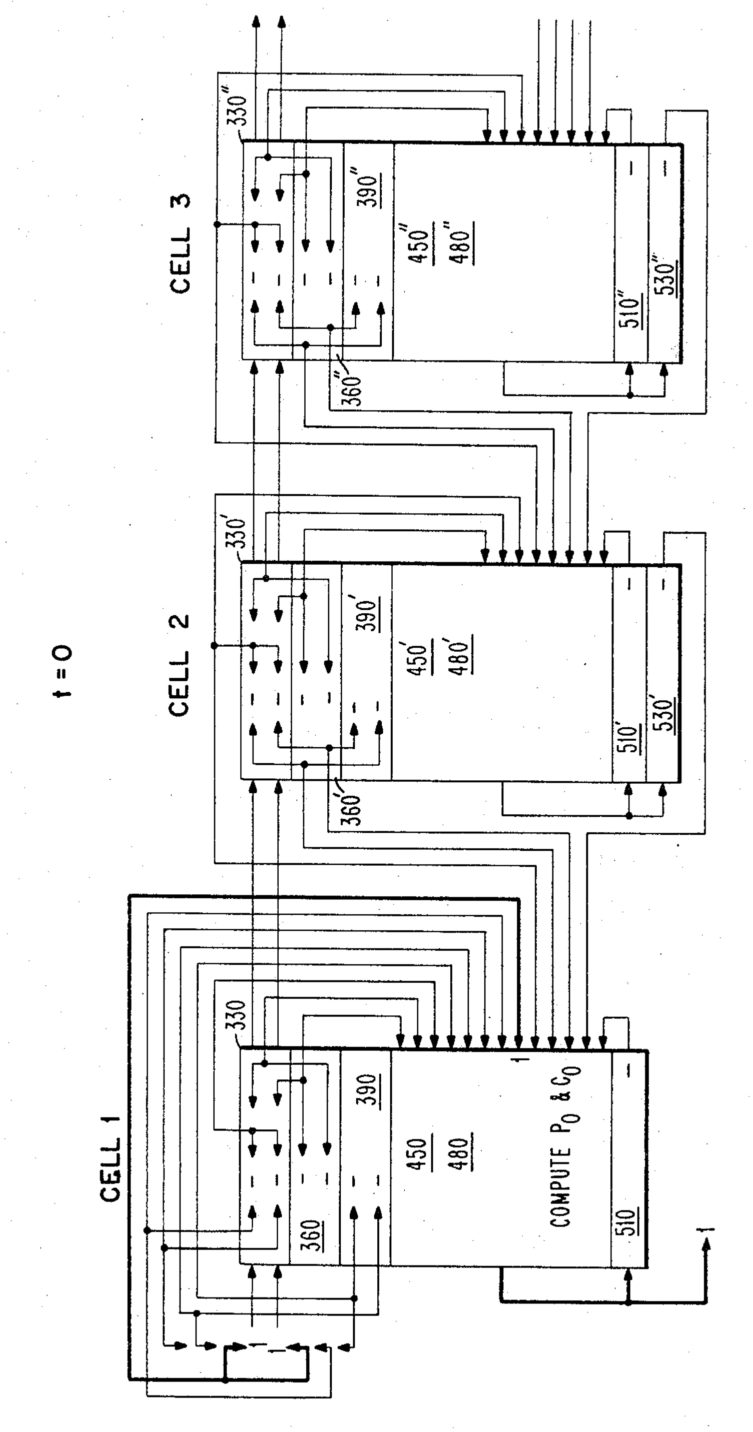

Referring to FIG. 14*a* and secondarily to FIGS. 8, 13*a* and 13*b*, the operational status of the multiplier circuits at the time $t=0$ is described. "One" pulses appear on both input lines **310*b* and 312*b* (as indicated by waveforms B and D of FIG. 8), causing lines 359 and 358 to activate the top two inputs to AND 436. Since the bottom input to AND 436 is up due to the reset state of trigger 332, AND 436 issues a "one" pulse which passes through OR 442 to line 434 which transmits it to the input of sum and carry digits computation circuits 480 and 450. This is indicated by the darkened arrow into the box labeled 450–480** in FIG. 14*a*. The signal immediately triggers exclusive OR's 481, 487, 491 and 493 to produce an output "one" pulse on multiplier output line 535. This is indicated by the darkened arrow out of the computation circuit block of FIG. 14*a*. Also, waveform F of FIG. 8 indicates this substantially instantaneous appearance of the first product output digit by the positive rise shown at $t=0$. During the latter portion of the first time interval when the input pulses on lines 310 and 312 have terminated, output line 535 drops back down since, there being no sum digit storage trigger, there is nothing to hold it up. Also, during the latter portion of the first time interval, triggers 337 and 338 both exhibit "one" outputs after having been switched in response to timing pulse T1 and the input signals on lines **310*b* and 312*b***.

Figure 14B:
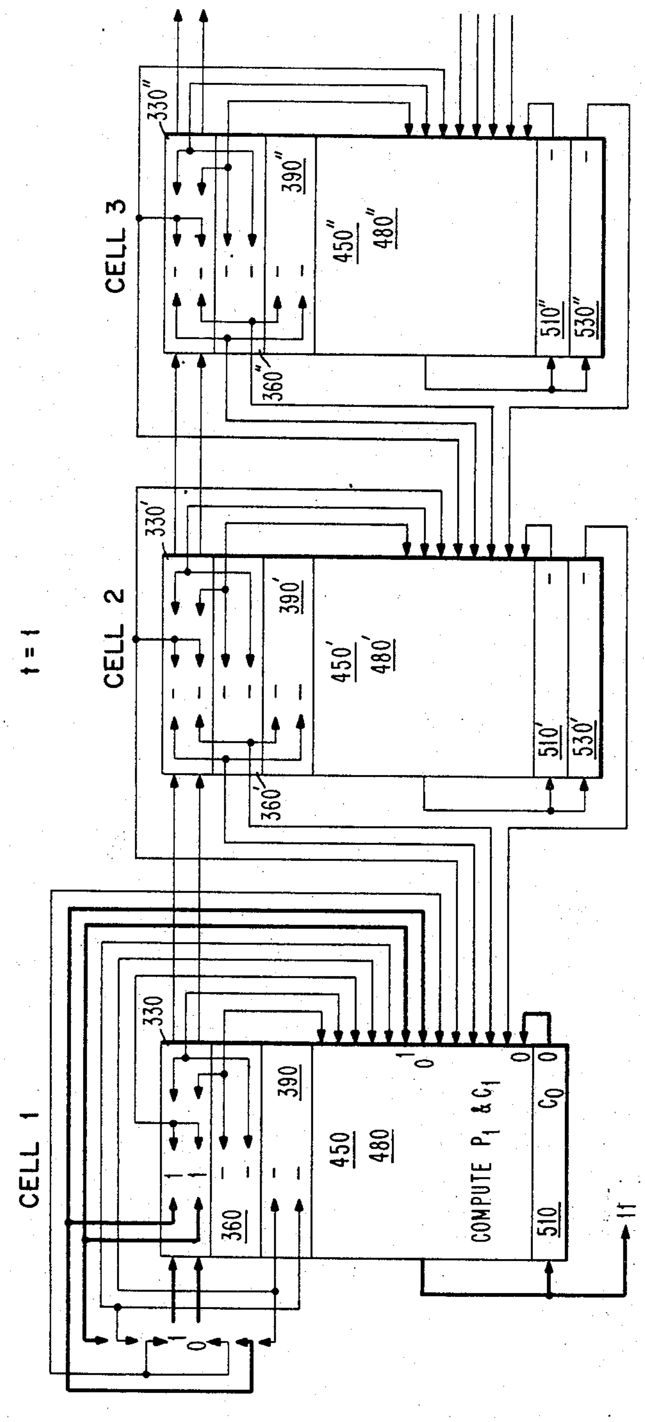

Thus, as shown in FIG. 14*b*, at $t=1$ the first order digit set is present in TSL 330 and the second order digit set appears at the input thereto as a pair of pulses on lines **310*b* and 312*a* (FIG. 8 waveforms B and C). At this instant, before timing pulse T2 has switched any of the triggers, AND 439 issues a "one" pulse onto line 435 (represented by the top darkened arrow into computation circuits 450–480** of FIG. 14*b*), and once again exclusive OR circuits 481, 487, 491 and 493 are triggered, generating the second product digit $P_1$ on output line 535. The middle and bottom darkened arrows into circuits 450–480 of FIG. 14*b* represent "zero" inputs coming from AND 437 and carry digits storage trigger outputs **528*a*–528*f***, respectively.

Timing pulse T2 causes the first order digit set to be shifted from triggers 337 and 338 to LSL triggers 398 and 399, respectively, and causes the second order digit signals to shift into triggers 337 and 338, causing "one" output line **339*b* of the former to be up and the corresponding output line 340*b* of the latter to be down. None of the carry digits storage triggers are switched to the "one" state by pulse T2** since the computation of carry digit $C_1$ performed at $t=1$ resulted in a "zero."

Figure 14C:
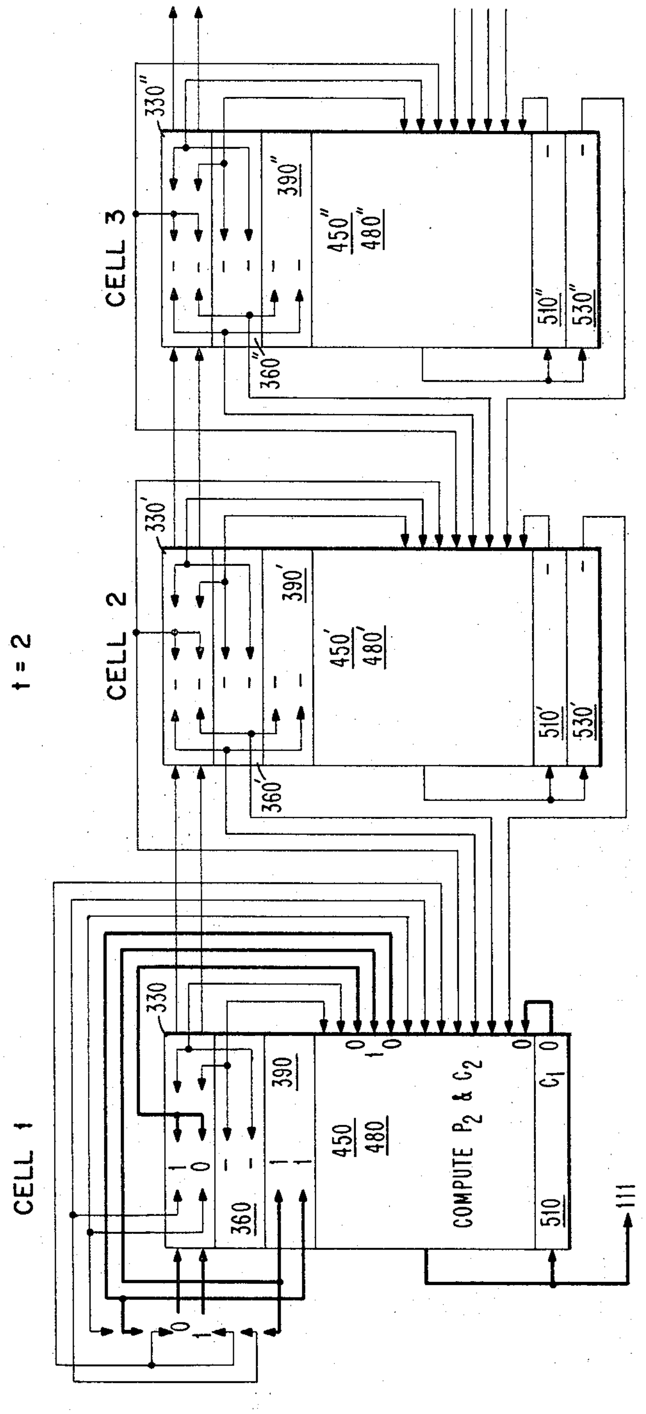

As shown in FIG. 14*c*, the third order digit set arrives at the input to TSL 330 at $t=2$ causing a third "one" to be emitted on multiplier output line 535 as the third product ouput digit, $P_2$. This result is produced by the issuance of a "one" pulse from AND 441 which triggers exclusive OR circuits 481, 487, 491 and 493 a third time, bringing output line 535 up for a third time as shown by waveform F of FIG. 8. Shortly thereafter timing pulse T3 switches the second order digit set from TSL 330 to USL 360, thus causing trigger 371 to switch to its "one" state and maintaining trigger 372 in its "zero" condition (assuming a "zero" had previously been stored in trigger 372). The same timing pulse switches the third order digit set into triggers 337 and 338, causing the former to switch to "zero" and the latter to switch to "one." Since the computation of $C_2$ performed at $t=2$ still results in "zero," pulse T3 does not switch any of the carry digits storage triggers and the lines **528*a*–528*f* all remain in a down condition. It is to be noted that the switching of triggers 338 and 371 to their "one" states by T3 causes the activation of the top two inputs to AND 424. Since T3 also switches gating trigger 364 to its set state, the third input to AND 424 is also activated, causing line 432 to be up and causing exclusive OR's 482, 487, 491 and 493 to maintain a "one" output level on line 535. This explains why the waveform F remains up after pulse T3, as opposed to its previous behavior following pulses T1 and T2**.

Figure 14D:
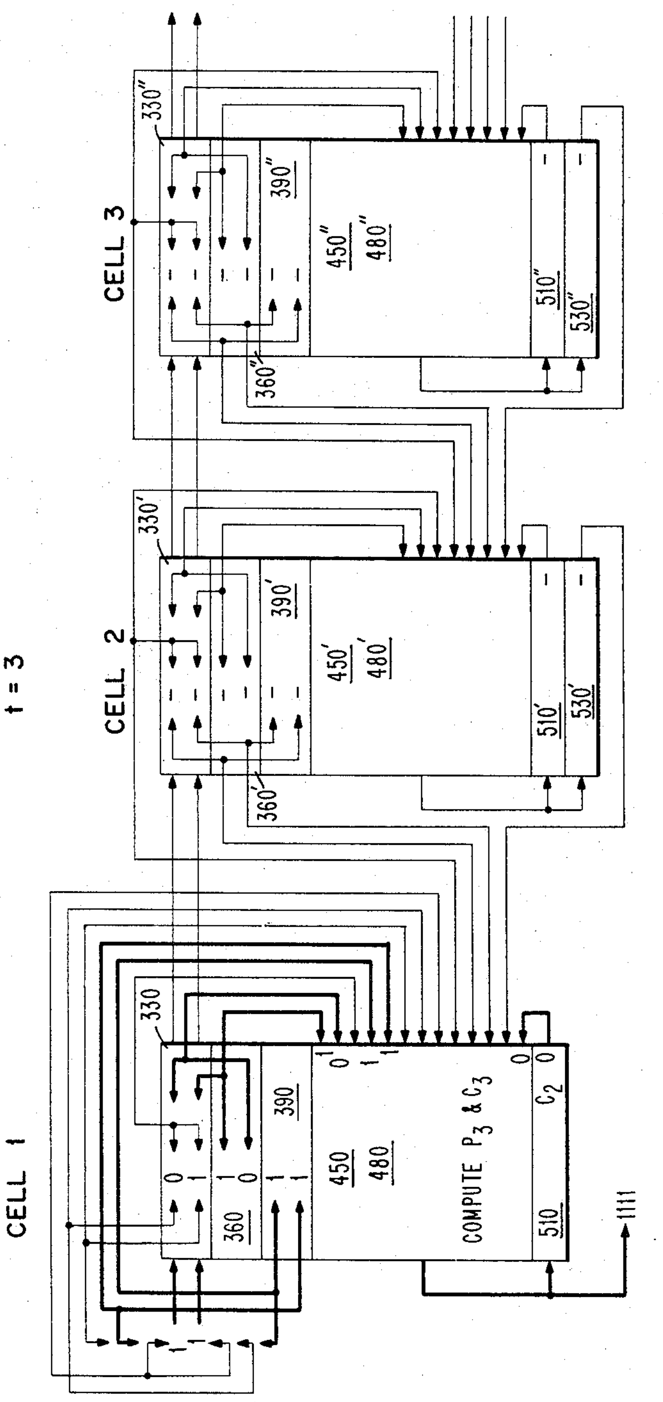

At $t=3$, FIG. 14*d*, the fourth order digit set arrives at the inputs to TSL 330, causing pulses to appear on lines **310*b* and 312*b* (FIG. 8 waveforms B and D). This causes a pair of "one" pulses to be issued from AND's 438 and 441 onto lines 434 and 435, respectively, adding to the "one" already present on line 432. This activates exclusive OR's 482, 487, 491 and 493 to produce a "one" for the fourth product output digit, $P_3$, on line 535 and further causes threshold circuit 543 to activate the right-hand input to AND 515**. This indicates that carry $C_3$ is a "one."

Timing pulse T4 thereafter switches trigger 524 to its "one" state. The timing pulse further causes the third order digit set to be shifted from TSL 330 of cell 1 to TSL cell 330′ of cell 2 and causes the fourth order digit set to be entered into triggers 337 and 338 of TSL 330. Therefore, at termination of the fourth order digit signals at the multiplier input, AND's 438 and 441 drop their outputs. There being only two "one" inputs remaining into the sum digit computation circuit 480, i.e., those inputs appearing on line **528*a* into exclusive OR 486 and on line 432 into exclusive OR 482, the level on output line 535** drops, as shown between $t=3$ and $t=4$ on waveform F of FIG. 8.

Figure 14E:
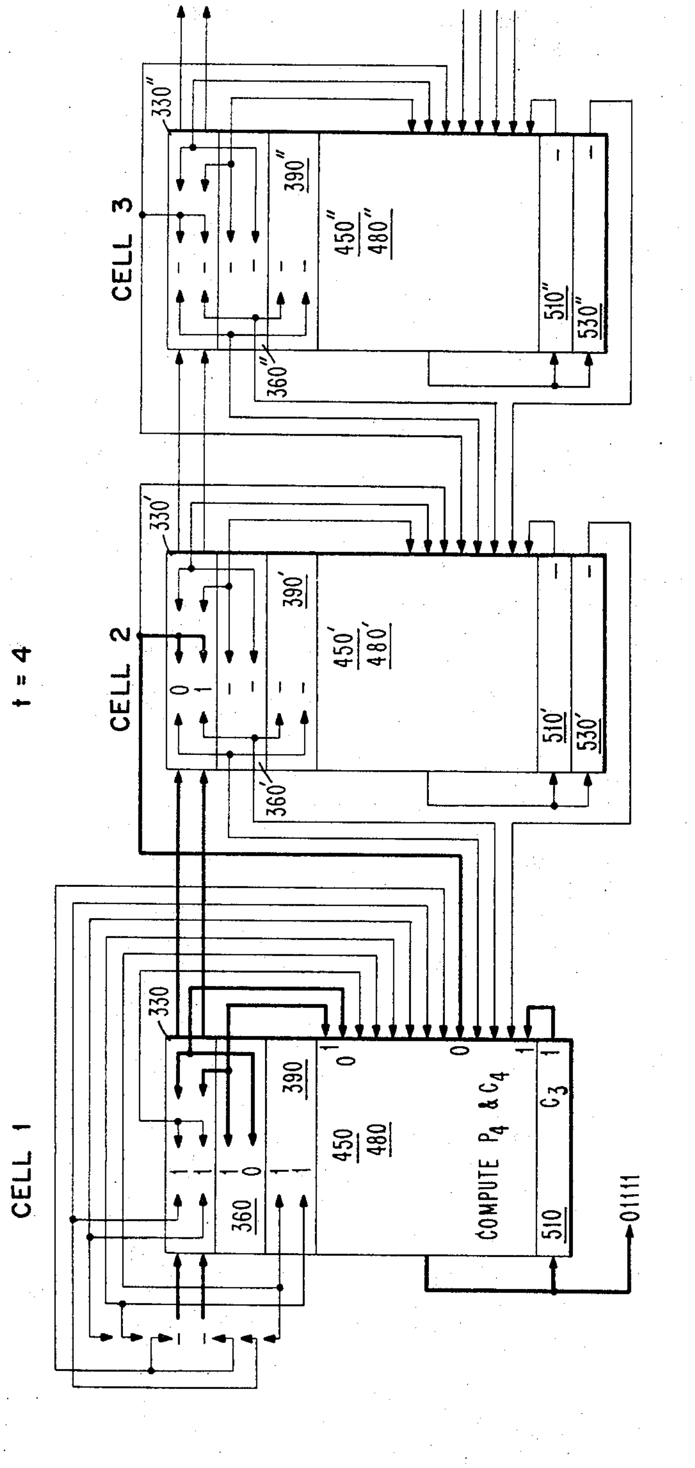
Figure 14F:
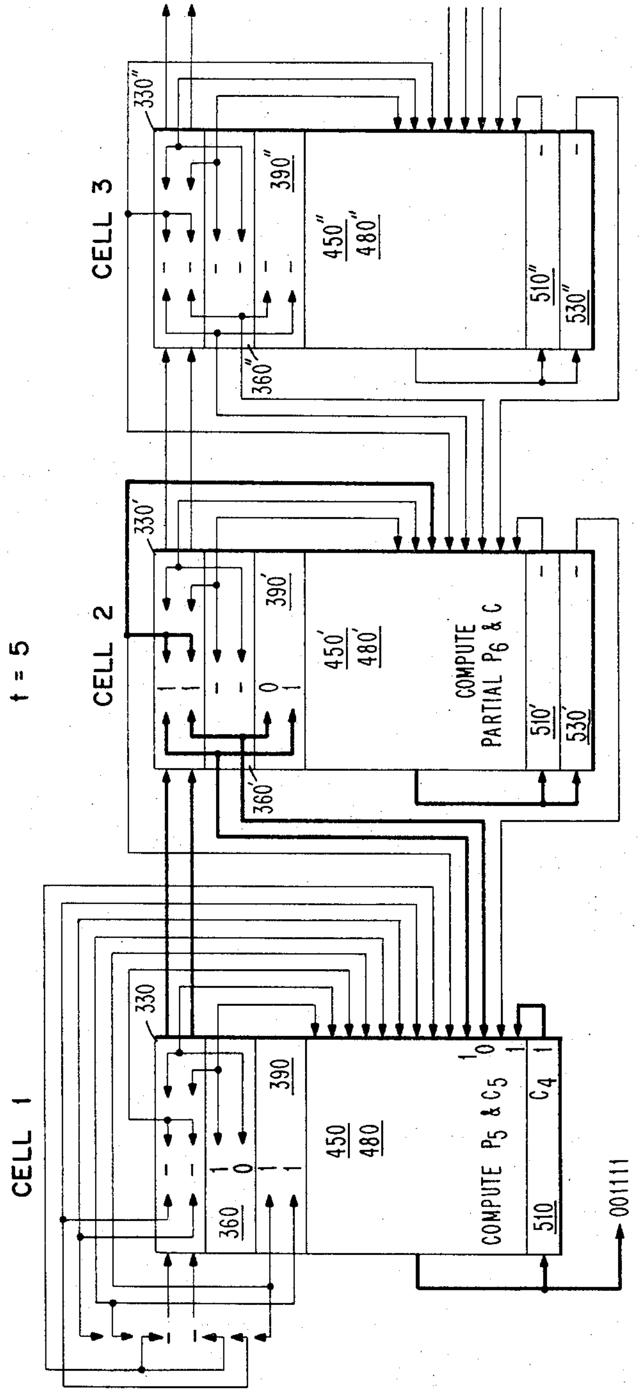

At $t=4$, as shown in FIG. 14*e*, the condition of the multiplier remains the same as that which existed as described above after termination of T4 since no new digit set arrives at the input. The fifth product digit $P_4$ sampled on line 535 at $t=4$ is thus "zero." Timing pulse T5 switches the multiplier into the state in which it exists at $t=5$. This is depicted in FIG. 14*f*. As there shown, the third order digit set has been shifted from TSL 330′ to LSL 390′ and the fourth order digit set has shifted from TSL 330 to TSL 330′. This causes a pair of cross-product digits "one" and "zero" to be transferred to the computation circuits 450–480 of cell 1 to be added to the "one" carry digit $C_4$ to produce a "zero" for output digit $P_5$ on line 535. At the same time a cross-product digit of "one" resulting from the cross-multiplication of the digits of the fourth order digit set located in TSL 330′ is transmitted to the computation circuits 450′–480′ of cell 2, where a sum digit of "one" and carry digits of "zero" are computed and presented to the inputs of sum and carry digit storage circuits 510′ and 530′, respectively. Thereafter timing pulse T6 switches the multiplier to the state at which it exists at $t=6$.

Figure 14G:
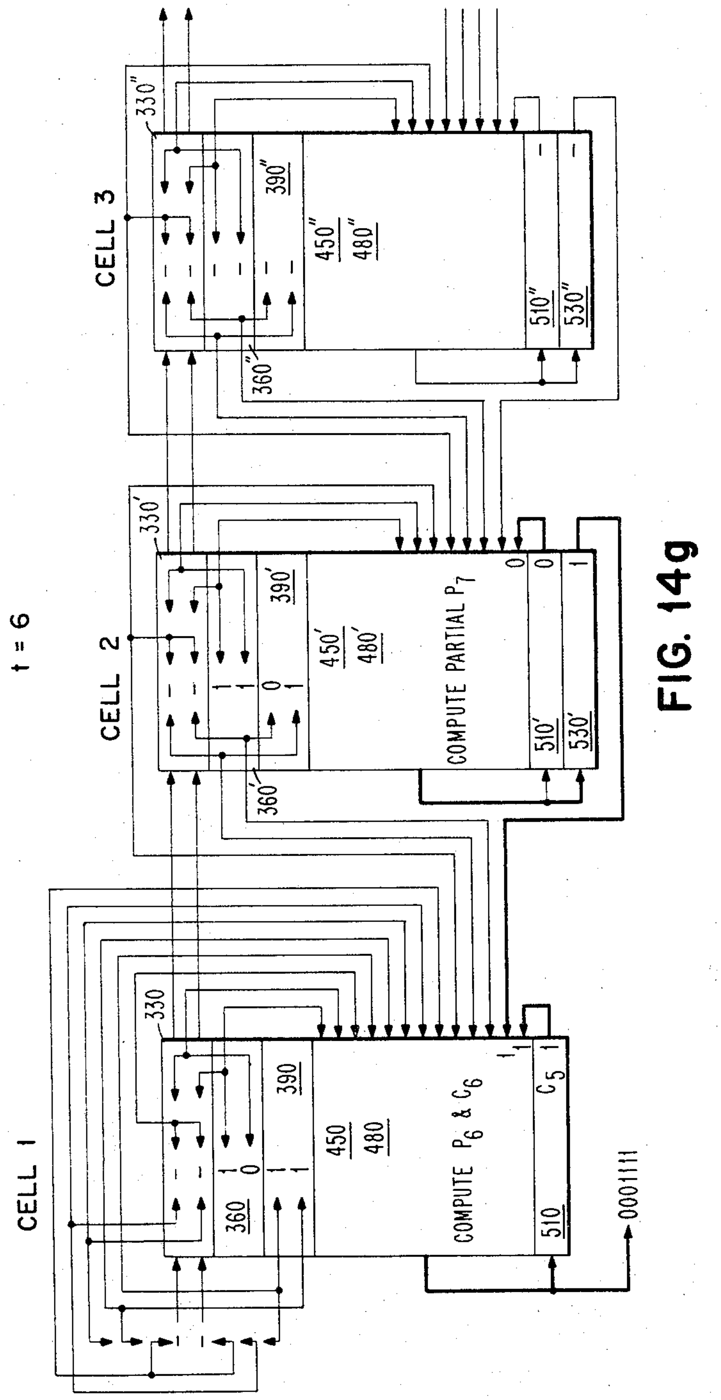

Looking at FIG. 14*g*, it is seen that at $t=6$ the fourth order digit set has been shifted into USL 360' and the sum and carry digits computed by the circuits 450–480 and 450'–480' during the preceding time interval have been shifted into storage circuits 510 and 510', 530'. This causes the seventh product output digit, $P_6$, to be computed in circuit 450 and presented on line 535 as a "zero." A digit representing $C_6$ has been computed in circuit 450 and is present at the input to storage circuit 510 while a digit representing partial accumulation of product digit $P_7$ has been calculated in circuit 480' and is presented to the input of sum digit storage circuit 530'. Timing pulse T7 thereafter switches the multiplier to the condition at which it exists at $t=7$, shown in FIG. 14*h*.

Figure 14H:
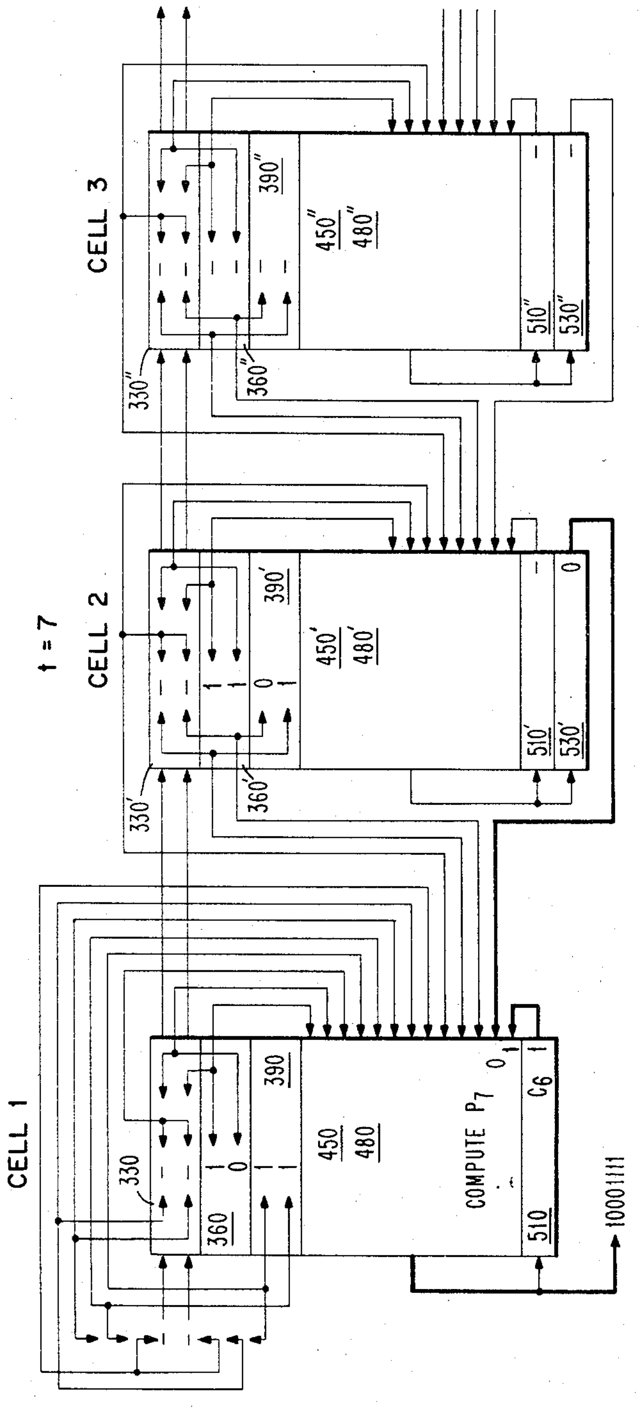

As seen in FIG. 14*h*, the eighth and final product output digit $P_7$ has been computed in circuit 450 on the basis of inputs supplied from circuits 510 and 530'. A "one" is thus present on line 535.

Since no more significant digits can be produced at the output, timing pulse T8 causes output line 535 to drop to "zero" where it stays no matter how long the timing pulses continue. In order to determine which output digit is the final output digit, means (not shown) may be supplied to count the number of total operand digits presented at the input and to turn off the circuits which sample output line 535 after a number of time intervals equal to the total number of digits in both operands has elapsed. This technique may also be employed with the unit-delay multiplier.

Another way of determining when the final product digit has been issued from cell 1 is to add two additional triggers to each cell and to interconnect all these triggers to form a pair of bidirectional shift registers. An "end of block" signal included with the last-appearing (most significant) digit of each operand is entered into one of the shift registers upon its arrival at the first cell. Each shift register thereafter propagates a "tag" signal from cell to cell at the same rate that its corresponding operand digit is shifted toward its final storage location. When the operand digit reaches this location and is shifted from the TSL, the corresponding tag signal in the bidirectional shift register is reversed and begins propagating back toward cell 1. When both tag signals arrive back at cell 1, as may be determined by, for example, a coincidence circuit, an end of block signal is issued, after a two time interval delay in the unit delay embodiment and after a one time interval delay in the no delay embodiment, along with the product digit to signify that it is the last significant output digit.

In order to reset the multiplier to perform another multiplication operation, reset line 318 (FIG. 13*a*) is pulsed so that gating triggers 332, 364, and 392 are reset. Thereafter, any succession of digit signals on input lines 310 and 312 initiates a new series of product output digits on line 535. A similar resetting operation is performed in the unit-delay multiplier by pulsing reset line 18 (FIG. 5*a*) to reset triggers 32, 64 and 92.

While the invention has been particularly shown and described with reference to preferred embodiments thereof, it will be understood by those skilled in the art that various changes in form and details may be made therein without departing from the spirit and scope of the invention.

What is claimed is:

1. A digital multiplier for serially generating the product of two operands, the digits of said operands being represented by serially occurring groups of electrical signals, each group being representative of a digit set including a digit from the first operand and a digit of like digital order from the second operand, said digit sets being manifested by said signal groups in ascending digital order, said multiplier comprising:

means for receiving said signal groups and for conducting them, in the order in which they occur, along a data path;

multiplying means for sequentially cross-multiplying the digits of each said signal group traversing said data path by the digits of different groups of previously received signal groups, thereby producing a series of first cross-product digit signals, and for multiplying the digits of each said digit group in said data path by each other when the number of previously received signal groups by which said group has not been cross-multiplied has been reduced to a predetermined quantity, thereby producing a series of second cross-product digit signals;

an accumulating register having a plurality of digit accumulating and storage positions; and means for periodically channelling all of said first and second cross-product digit signals which contribute to the same digit of the product into a common position in said register.

2. A digital multiplier for serially generating the product of two operands, the digits of said operands being represented by serially occurring groups of electrical signals, each group being representative of a digit set including a digit from the first operand and a digit of like digital order from the second operand, said digit sets being manifested by said signal groups in ascending digital order, said multiplier comprising:

means for receiving said signal groups and for conducting them, in the order in which they occur, along a data path;

multiplying means for sequentially cross-multiplying the digits of each said signal group traversing said data path by the digits of different groups of previously received signal groups, each said different group including no more than two previously received signal groups, thereby producing a series of first cross-product digit signals, and for multiplying the digits of each said digit group in said data path by each other when the number of previously received signal groups by which said group has not been cross-multiplied has been reduced to a number less than two, thereby producing a series of second cross-product digit signals;

an accumulating register having a plurality of digit accumulating and storage positions; and means for periodically channeling all of said first and second cross-product digit signals which contribute to the same digit of the product into a common position in said register.

3. A digital multiplier for serially generating the product of two operands, the digits of said operands being represented by serially occurring groups of electrical signals, each group being representative of a digit set including a digit from the first operand and a digit of like digital order from the second operand, said digit sets being manifested by said signal groups in ascending digital order at a rate of one digit set per time period, said multiplier comprising:

means for receiving said signal groups and for conducting them, in the order in which they occur, along a data path;

multiplying means, operable once per time period, for cross-multiplying the digits of each said signal group traversing said data path by the digits of a group of previously received signal groups no greater than two in number, thereby producing a series of first cross-product digit signals, and for multiplying the digits of each said signal group in said data path by each other when the number of previously received signal groups by which said group has not been cross-multiplied has been reduced to a number less than two, thereby producing a series of second cross-product digit signals;

a plurality of adding circuits, each said circuit including a plurality of input circuits and output circuits, each said adding circuit generating at one of its outputs a sum digit signal representative of the low order digit of the sum of the digits represented by digit signals received at its inputs and further generating at its remaining outputs carry digit signals representative of the carry digits of said sum;

a plurality of sum digit storage registers, each one for storing the sum digit from a different one of said adding circuits, each having an input responsive to the adding circuit whose sum digit it stores and an output circuit;

first signal conducting means connecting the output of each said sum digit storage register to an input of an adding circuit other than the one whose sum digit it stores;

a plurality of carry digit storage registers, each one for storing the carry digits from a different one of said adding circuits, each having an input responsive to the adding circuit whose carry digits it stores and an output circuit;

second signal conducting means connecting the output of each carry digit storage register to an input of the adding circuit whose carry digits it stores;

digits transfer means operable each time period to transfer all the first and second cross-product digits, generated by said multiplying means during said time period, which contribute to the same digit of the product, to the inputs of a common adding circuit, said digit transfer means further operating to transfer the sum and carry digit signals stored in each said sum and carry digit storage register, respectively, to the inputs of said adding circuit to which each said register is connected by said first and second signal conducting means, and means operative at the beginning of each time period to transfer the sum and carry digit signals appearing at the outputs of each said adding circuit to the inputs of the sum and carry digit storage registers, respectively.

4. A digital multiplier for serially generating the product of two operands, the digits of said operands being represented by serially occurring groups of electrical signals, each group being representative of a digit set including a digit from the first operand and a digit of like digital order from the second operand, said digit sets being manifested by said signal groups in ascending digital order at a rate of one digit set per time period, said multiplier comprising:

a shifting register having a plurality of signal storage positions;

means for entering said signal groups, in the order in which they occur, into said shifting register and for transferring said groups from one position to the next in said register;

multiplying means, operable once per time period, for cross-multiplying the digits of each said signal group stored in a shifting register position by the digits of a group of previously received signal groups no greater than two in number, thereby producing a series of first cross-product digit signals, and for multiplying the digits of each said signal group stored in a shifting register position by each other when the number of previously received signal groups by which said group has not been cross-multiplied has been reduced to a number less than two, thereby producing a series of second cross-product digit signals;

an accumulating register having a plurality of digit accumulating and storage positions; and means for channeling all of said first and second cross-product digit signals which contribute to the same digit of the product into a common position in said accumulating register.

5. A digital multiplier for serially generating the product of two operands, the digits of said operands being represented by serially occurring groups of electrical signals, each group being representative of a digit set including a digit from the first operand and a digit of like digital order from the second operand, said digit sets being manifested by said signal groups in ascending digital order at a rate of one digit set per time period, said multiplier comprising:

a shifting register having a plurality of signal storage positions;

a pair of signal storage registers, each pair responsively connected to a different position of said shifting register, each register storing one said signal group;

means for entering said signal groups, in the order in which they occur, into said shifting register and for transferring said groups from one position to the next in said shifting register, said means being further operable to transfer signal groups stored in said shifting register positions to the unoccupied signal storage registers connected thereto so that said signal storage registers are consecutively loaded;

multiplying means, operable once per time period, for cross-multiplying the digits of at least one signal group stored in each position of said shifting register by the digits of a signal group stored in at least one of said signal storage registers connected to the shifting register position, thereby producing a series of first cross-product digit signals, and for multiplying the digits of each said signal group stored in a shifting register position by each other when the number of previously received signal groups by which said group has not been cross-multiplied has been reduced to a number less than two, thereby producing a series of second cross-product digit signals;

an accumulating register having a plurality of digit accumulating and storage positions, and means for channeling all of said first and second cross-product digit signals which contribute to the same digit of the product into a common position in said accumulating register.

6. A digital multiplier for serially generating the product of two operands, the digits of said operands being represented by serially occurring groups of electrical signals, each group being representative of a digit set including a digit from the first operand and a digit of like digital order from the second operand, said digit sets being manifested by said signal groups in ascending digital order at a rate of one digit set per time period, said multiplier comprising:

a shifting register having a plurality of signal storage positions;

a pair of signal storage registers, each pair responsively connected to a different position of said shifting register, each register storing one said signal group;

pulse generation means for generating a series of timing pulses at a rate of one pulse each said time period;

means operative in response to said timing pulses at the beginning of each said time period for entering said signal groups, in the order in which they occur, into said shifting register and for thereafter transferring each said group from one position to the next in said register, said means being further operable to transfer signal groups stored in said shifting register positions to the unoccupied signal storage registers connected thereto so that said signal storage registers are consecutively loaded;

multiplying means, operable each time period, for cross-multiplying the digits of at least one signal group stored in each position of said shifting register by the digits of a signal group stored in at least one of said signal storage registers connected to the shifting register position, thereby producing a series of first cross-product digit signals, and for multiplying the digits of each said signal group stored in a shifting register position by each other when the number of previously occurring signal groups by which said group has not been cross-multiplied has been reduced to a number less than two, thereby producing a series of second cross-product digit signals;

a plurality of adding circuits, each including a plurality of input circuits and output circuits, each said adding circuit generating at one of its outputs a sum digit signal representative of the low order digit of the sum of the digits represented by digit signals received at its inputs and further generating at its remaining outputs carry digit signals representative of the carry digits of said sum;

a plurality of sum digit storage registers, each one for storing the sum digit from a different one of said adding circuits, each having an input responsive to the adding circuit whose sum digit it stores and an output circuit;

first signal conducting means connecting the output of each said sum digit storage register to an input of an adding circuit other than the one whose sum digit it stores;

a plurality of carry digit storage registers, each one for storing the carry digits from a different one of said adding circuits, each having an input responsive to the adding circuit whose carry digits it stores and an output circuit;

second signal conducting means connecting the output of each said carry digit storage register to an input of the adding circuit whose carry digits it stores;

digit transfer means operable each time period for transferring the first and second cross-product digit signals, generated by said multiplying means during said time period, which contribute to the same digit of the product, to the inputs of a common adding circuit, said digit transfer means further operating to transfer the sum and carry digit signals stored in each said sum and carry digit storage register, respectively, to the inputs of the adding circuit to which each said register is connected by said first and second signal conducting means, and means operative in response to said timing pulses at the beginning of each said time period to transfer the sum and carry digit signals appearing at the outputs of each said adding circuit to the inputs of the sum and carry digit storage registers, respectively.

7. A digital multiplier for serially generating the product of two operands, the digits of said operands being represented by serially occurring groups of electrical signals, each group being representative of a digit set including a digit from the first operand and a digit of like digital order from the second operand, said digit sets being manifested by said signal groups in ascending digital order at a rate of one digit set per time period, said multiplier comprising:

a shifting register having a plurality of signal storage positions, each said position storing one said signal group;

a pair of signal storage registers, each pair responsively connected to a different position of said shifting register, each register storing one said signal group;

means for entering said signal groups, in the order in which they occur, into said shifting register and for transferring said groups from one position to the next in said shifting register, said means being further operable to transfer signal groups stored in said shifting register positions to the unoccupied signal storage registers connected thereto so that said signal storage registers are consecutively loaded;

multiplying means, operable once per time period, for cross-multiplying the digits of each signal group stored in a shifting register position by the digits of all signal groups stored in the signal storage registers connected to said shifting register position, thereby producing a series of first cross-product digit signals, and for multiplying the digits of each said signal group stored in a shifting register position by each other when the number of previously occurring signal groups by which said group has not been cross-multiplied has been reduced to a number less than two, thereby producing a series of second cross-product digit signals;

an accumulating register having a plurality of digit accumulating and storage positions, and means for channeling all of said first and second cross-product digit signals which contribute to the same digit of the product into a common position in said accumulating register.

8. A digital multiplier for serially generating the product of two operands, the digits of said operands being represented by serially occurring groups of electrical signals, each group being representative of a digit set including a digit from the first operand and a digit of like digital order from the second operand, said digit sets being manifested by said signal groups in ascending digital order at a rate of one digit set per time period, said multiplier comprising:

a shifting register having a plurality of signal storage positions, each said position storing one said signal group;

a pair of signal storage registers, each pair responsively connected to a different position of said shifting register, each register storing one said signal group;

pulse generation means for generating a series of timing pulses at a rate of one pulse each said timing period;

means operative in response to said timing pulses at the beginning of each said time period for entering said signal groups, in the order in which they occur, into said shifting register and for thereafter transferring each said group from one position to the next in said register, said means being further operable to transfer signal groups stored in said shifting register positions to the unoccupied signal storage registers connected thereto so that said signal storage registers are consecutively loaded;

multiplying means, operable once per time period, for cross-multiplying the digits of each said signal group stored in a shifting register position by the digits of the signal groups stored in the signal storage registers connected to said shifting register position, thereby producing a series of first cross-product digit signals, and for multiplying the digits of each said signal group stored in a shifting register position by each other when the number of previously occurring signal groups by which said group has not been cross-multiplied has been reduced to a number less than two, thereby producing a series of second cross-product digit signals;

a plurality of adding circuits, each including a plurality of input circuits and output circuits, each said adding circuit generating at one of its outputs a sum digit signal representative of the low order digit of the sum of the digits represented by digit signals received at its inputs and further generating at its remaining outputs carry digit signals representative of the carry digits of said sum;

a plurality of sum digit storage registers, each one for storing the sum digit from a different one of said adding circuits, each having an input responsive to the adding circuit whose sum digit it stores and an output circuit;

first signal conducting means connecting the output of each said sum digit storage register to an input of an adding circuit other than the one whose sum digit it stores;

a plurality of carry digit storage registers, each one for storing the carry digits from a different one of said adding circuits, each having an input responsive to the adding circuit whose carry digits it stores and an output circuit;

second signal conducting means connecting the output of each said carry digit storage register to an input of the adding circuit whose carry digits it stores;

digit transfer means operable each time period for transferring the first and second cross-product digit signals, generated by said multiplying means during said time period, which contribute to the same digit of the product, to the inputs of a common adding circuit, said digit transfer means further operating to transfer the sum and carry digit signals stored in each said sum and carry digit storage register, respectively, to the inputs of the adding circuit to which each said register is connected by said first and second signal conducting means; and means operative in response to said timing pulses at the beginning of each said time period to transfer the sum and carry digit signals appearing at the outputs of each said adding circuit to the inputs of the sum and carry digit storage registers, respectively.

9. A digital multiplier for serially generating the product of two operands, the digits of said operands being represented by serially occurring groups of electrical signals, each group being representative of a digit set including a digit from the first operand and a digit of like digital order from the second operand, said digit sets being manifested by said signal groups in ascending digital order at a rate of one digit set per time period, said multiplier comprising:

a shifting register having an initial storage position and a plurality of subsequent storage positions connected thereto;

a pair of signal storage registers, each pair responsively connected to a different position of said shifting register, each register storing one said signal group;

pulse generation means for generating a series of timing pulses at a rate of one pulse each said timing period;

means operative in response to said timing pulses at the beginning of each said time period for entering said signal groups, in the order in which they occur, into said initial shifting register position and for thereafter transferring each said group away from said initial position from one said subsequent position to the next in said register, said means being further operable to transfer signal groups stored in said shifting register positions to unoccupied signal storage registers connected thereto so that said signal storage registers are consecutively loaded;

a plurality of multiplying circuits, each one responsively connected to a different position in said shifting register and to the pair of signal storage registers connected to that shift register position, said multiplying circuits operable each time period for cross-multiplying the digits of at least one signal group stored in each position of said shifting register by the digits of a signal group stored in at least one of the signal storage registers connected to said position, thereby producing a plurality of first cross-product digit signals, and for multiplying the digits of each said signal group stored in each position of said shifting register by each other when the number of previously occurring signal groups by which said group has not been cross-multiplied has been reduced to a number less than two, thereby producing a second cross-product digit signal;

a plurality of adding circuits, one circuit assigned to each said shifting register position, including a plurality of input circuits and output circuits, each said adding circuit generating at one of its outputs a sum digit signal representative of the low order digit of the sum of the digits represented by digit signals received at its inputs and further generating at its remaining outputs carry digit signals representative of the carry digits of said sum;

a plurality of sum digit storage registers, each one for storing the sum digit from a different one of said adding circuits, each having an input responsive to the adding circuit whose sum digit it stores and an output circuit;

first signal conducting means connecting the output of each said sum digit storage register to an input of the adding circuit assigned to the next adjacent shifting register position towards said initial position;

a plurality of carry digit storage registers, each one for storing the carry digits from a different one of said adding circuits, each having an input responsive to the adding circuit whose carry digits it stores and an output circuit;

second signal conducting means connecting the output of each said carry digit storage register to an input of the adding circuit whose carry digits it stores;

digit transfer means operable each time period for transferring to the inputs of each said adding circuit first and second cross-product digit signals which contribute to the same digit of the product and which were generated during said time period by the multiplying circuit connected to the shifting register position to which said adding circuit is assigned and by the multiplying circuit connected to the next adjacent shifting register position towards said initial position, said digit transfer means further operating to transfer the sum and carry digit signals stored in each said sum and carry digit storage register, respectively, to the inputs of said adding circuit to which each said register is connected by said first and second signal conducting means; and means operative in response to said timing pulses at the beginning of each said time period to transfer the sum and carry digit signals appearing at the outputs of each said adding circuit to the inputs of the sum and carry digit storage registers, respectively.

10. A digital multiplier for serially generating the product of two operands, the digits of said operands being represented by serially occurring groups of electrical signals, each group being representative of a digit set including a digit from the first operand and a digit of like digital order from the second operand, said digit sets being manifested by said signal groups in ascending digital order at a rate of one digit set per time period, said multiplier comprising:

a shifting register having an initial storage position and a plurality of subsequent storage positions connected thereto, each said position storing one said signal group;

a pair of signal storage registers, each pair responsively connected to a different position of said shifting register, each register storing one said signal group;

pulse generation means for generating a series of timing pulses at a rate of one pulse each said time period;

means operative in response to said timing pulses at the beginning of each said time period for entering said signal groups, in the order in which they occur, into said initial shifting register position and for thereafter transferring each said group away from said initial position from one said subsequent position to the next in said register, said means being further operable to transfer signal groups stored in said shifting register positions to unoccupied signal storage registers connected thereto so that said signal storage registers are consecutively loaded;

a plurality of multiplying circuits, each one responsively connected to a different position in said shifting register and to the pair of signal storage registers connected to that shift register position, said multiplying circuits operable each time period for cross-multiplying the digits of each said signal group stored in a shifting register position by the digits of the signal groups stored in the signal storage registers connected to said shifting register position, thereby producing a plurality of first cross-product digit signals, and for multiplying the digits of each said signal group stored in each position of said shifting register by each other when the number of previously occurring signal groups by which said group has not been cross-multiplied has been reduced to a number less than two, thereby producing a second cross-product digit signal;

a plurality of adding circuits, one circuit assigned to each said shifting register position, including a plurality of input circuits and output circuits, each said adding circuit generating at one of its outputs a sum digit signal representative of the low order digit of the sum of the digits represented by digit signals received at its inputs and for generating at its remaining outputs carry digit signals representative of the carry digits of said sum;

a plurality of sum digit storage registers, each one for storing the sum digit from a different one of said adding circuits, each having an input responsive to the adding circuit whose sum digit it stores and an output circuit;

first signal conducting means connecting the output of each said sum digit storage register to an input of the adding circuit assigned to the next adjacent shifting register position toward said initial position;

a plurality of carry digit storage registers, each one for storing the carry digits from a different one of said adding circuits, each having an input responsive to the adding circuit whose carry digits it stores and an output circuit;

second signal conducting means connecting the output of each said carry digit storage register to an input of the adding circuit whose carry digits it stores;

digit transfer means operable each time period for transferring to the inputs of each said adding circuit first and second cross-product digit signals which contribute to the same digit of the product and which were generated during said time period by the multiplying circuit connected to the shifting register position to which said adding circuit is assigned and by the multiplying circuit connected to the next adjacent shfting register position toward said initial position, said digit transfer means further operating to transfer the sum and carry digit signals stored in each said sum and carry digit storage register, respectively, to the inputs of said adding circuit to which each said register is connected by said first and second signal conducting means; and means operative in response to said timing pulses at the beginning of each said time period to transfer the sum and carry digit signals appearing at the outputs of each said adding circuit to the inputs of the sum and carry digit storage registers, respectively.

11. A digital multiplier for serially generating the product of two operands, the digits of said operands being represented by serially occurring groups of electrical signals, each group being representative of a digit set including a digit from the first operand and a digit of like digital order from the second operand, said digit sets being manifested by said signal groups in ascending digital order at a rate of one digit set per time period, said multiplier comprising:

a shifting register having an initial storage position and a plurality of subsequent storage positions connected thereto, said initial position including means for storing two said signal groups and said subsequent positions having means for storing one said signal group;

a pair of signal storage registers, each pair responsively connected to a different position of said shifting register, each register storing one said signal group;

means for entering said signal groups, in the order in which they occur, into said initial shifting register position and for thereafter transferring said groups from one position to the next in said register, said means being further operable to transfer signal groups stored in said shifting register positions to the unoccupied signal storage registers connected thereto so that said signal storage registers are consecutively loaded;

first multiplying means, operable once per time period, for cross-multiplying the digits of a first signal group stored in said initial shifting register position by the digits of a signal group stored in one of said signal storage registers connected thereto and for cross-multiplying the digits of a second signal group stored in said initial position by the digits of a signal group stored in the other of said connected signal storage registers, thereby producing a plurality of first cross-product digit signals, said first multiplying means further operating to multiply the digits of each said signal group stored in said initial shifting register position by each other when said signal groups are the first two groups received by said shifting register, thereby producing a plurality of second cross-product digit signals;

second multiplying means, operable once per time period, for cross-multiplying the digits of each signal group stored in said subsequent shifting register positions by the digits of the signal groups stored in the connected signal storage registers, thereby producing additional first cross-product digit signals, and for multiplying the digits of each said signal group stored in a subsequent shifting register position by each other when the number of previously occurring signal groups by which said group has not been cross-multiplied has been reduced to a number less than two, thereby producing additional second cross-product digit signals;

an accumulating register having a plurality of digit accumulating and storage positions; and means for channeling all of said first and second cross-product digit signals which contribute to the same digit of the product into a common position in said accumulating register.

12. A digital multiplier for serially generating the product of two operands, the digits of said operands being represented by serially occurring groups of electrical signals, each group being representative of a digit set including a digit from the first operand and a digit of like digital order from the second operand, said digit set being manifested by said signal groups in ascending digital order at a rate of one digit set per time period, said multiplier comprising:

a shifting register having an initial storage position and a plurality of subsequent storage positions connected thereto, said initial position including means for storing two said signal groups and said subsequent positions having means for storing one said signal group;

a pair of signal storage registers, each pair responsively connected to a different position of said shifting register, each register storing one said signal group;

pulse generation means for generating a series of timing pulses at a rate of one pulse each said time period;

means operative in response to said timing pulses at the beginning of each said time period for entering said signal groups in the order in which they occur, into said initial shifting register position and for thereafter transferring each said group from one position to the next in said register, said means being further operable to transfer signal groups stored in said shifting register positions to the unoccupied signal storage registers connected thereto so that said signal storage registers are consecutively loaded;

first multiplying means, operable each time period, for cross-multiplying the digits of a first signal group stored in said initial shifting register position by the digits of a signal group stored in one of said signal storage registers connected thereto, and for cross-multiplying the digits of a second signal group stored in said initial position by the digits of a signal group stored in the other of said connected signal storage registers, thereby producing a plurality of first cross-product digit signals, said first multiplying means further operating to multiply the digits of each said signal group stored in said initial shifting register position by each other when said signal groups are the first two groups received by said shifting register, thereby producing a plurality of second cross-product digit signals;

second multiplying means, operable each time period, for cross-multiplying the digits of each signal group stored in said subsequent shifting register positions by the digits of the signal groups stored in the connected signal storage registers, thereby producing additional first cross-product digit signals, and for multiplying the digits of each said signal group stored in a subsequent shifting register position by each other when the number of previously occurring signal groups by which said group has not been cross-multiplied has been reduced to a number less than two, thereby producing additional second cross-product digit signals;

a plurality of adding circuits, one circuit assigned to each said shifting register position, each said adding circuit including a plurality of input circuits and output circuits and generating at one of its outputs a sum digit signal representative of the low order digit of the sum of the digits represented by digit signals received at its inputs and further generating at its remaining outputs carry digit signals representative of the carry digits of said sum;

a plurality of sum digit storage registers, each one for storing the sum digit from a different one of said adding circuits except the adding circuit connected to said initial shifting register position, each having an input responsive to the adding circuit whose sum digit it stores and an output circuit;

first signal conducting means connecting the output of each said sum digit storage register to an input of an adding circuit other than the one whose sum digit it stores;

a plurality of carry digit storage registers, each one for storing the carry digits from a different one of said adding circuits, each having an input responsive to the adding circuit whose carry digits it stores and an output circuit;

second signal conducting means connecting the output of each said carry digit storage register to an input of the adding circuit whose carry digits it stores;

digit transfer means operable each time period for transferring the first and second cross-product digit signals, generated by said first and second multiplying means during said time period, which contribute to the same digit of the product, to the inputs of a common adding circuit, said digit transfer means further operating to transfer the sum and carry digit signals stored in each said sum and carry digit storage register, respectively, to the inputs of the adding circuit to which each said register is connected by said first and second signal conducting means; and means operative in response to said timing pulses at the beginning of each said time period to transfer the sum and carry digit signals appearing at the outputs of each said adding circuit to the inputs of the sum and carry digit storage registers, respectively.

13. A digital multiplier for serially generating the product of two operands, the digits of said operands being represented by serially occuring groups of electrical signals, each group being representative of a digit set including a digit from the first operand and a digit of like digital order from the second operand, said digit sets being manifested by said signal groups in ascending digital order at a rate of one digit set per time period, said multiplier comprising:

a shifting register having an initial storage position and a plurality of subsequent storage positions connected thereto;

a pair of signal storage registers, each pair responsively connected to a different position of said shifting register, each register storing one said signal group;

pulse generation means for generating a series of timing pulses at a rate of one pulse each time period;

means operative in response to said timing pulses at the beginning of each time period for entering said signal groups, in the order in which they occur, into said initial shifting register position and for thereafter transferring each said group away from said initial position from one of said subsequent position to the next in said register, said means being further operable to transfer signal groups stored in said shifting register positions to unoccupied signal storage registers connected thereto so that said signal storage registers are consecutively loaded;

a plurality of multiplying circuits, each one responsively connected to a different position in said shifting register and to the pair of signal storage registers connected to that shifting register position, said multiplying circuits operable each time period for cross-multiplying the digits of at least one signal group stored in each position of said shifting register by the digits of a signal group stored in at least one of the signal storage registers connected to said position, thereby producing a plurality of first cross-product digit signals, and for multiplying the digits of each said signal group stored in each position of said shifting register by each other when the number of previously occurring signal groups by which said group has not been cross-multiplied has been reduced to a number less than two, thereby producing a second cross-product digit signal;

a plurality of adding circuits, one circuit assigned to each said shifting register position, each said adding circuit including a plurality of input circuits and output circuits and generating at one of its outputs a sum digit signal representative of the low order digit of the sum of the digits represented by digit signals received at its inputs and further generating at its remaining outputs carry digit signals representative of the carry digits of said sum;

a plurality of sum digit storage registers, each one for storing the sum digit from a different one of said adding circuits except the adding circuit connected to said initial shifting register position, each having an input responsive to the adding circuit whose sum digit it stores and an output circuit;

first signal conducting means connecting the output of each said sum digit storage register to an input of the adding circuit assigned to the next adjacent shifting register position toward said initial position;

a plurality of carry digit storage registers, each one for storing the carry digits from a different one of said adding circuits, each having an input responsive to the adding circuit whose carry digits its stores and an output circuit;

second signal conducting means connecting the output of each said carry digit storage register to an input of the adding circuit whose carry digits it stores;

digit transfer means operable each time period for transferring to the inputs of each said adding circuit first and second cross-product digit signals which contribute to the same digit of the product and which were generated during said time period by the multiplying circuit connected to the shifting register position to which said adding circuit is assigned and by the multiplying circuit connected to the next adjacent shifting register position away from said initial position, said digit transfer means further operating to transfer the sum and carry digit signals stored in each said sum and carry digit storage register, respectively, to the inputs of said adding circuit to which each said register is connected by said first and second signal conducting means; and means operative in response to said timing pulses at the beginning of each said time period to transfer the sum and carry digit signals appearing at the outputs of each said adding circuit to the inputs of the sum and carry digit storage registers, respectively.

14. A digital multiplier for serially generating the product of two operands, the digits of said operands being represented by serially occurring groups of electrical signals each group being representative of a digit set including a digit from the first operand and a digit of like digital order from the second operand, said digit sets being manifested by said signal groups in ascending digital order at a rate of one digit set per time period, said multiplier comprising:

a shifting register having an initial storage position and a plurality of subsequent storage positions connected thereto, said initial position including means for storing two said signal groups and said subsequent positions each having means for storing one said signal group;

a pair of signal storage registers, each pair responsively connected to a different position of said shifting register, each register storing one said signal group;

pulse generation means for generating a series of timing pulses at a rate of one pulse each said time period;

means operative in response to said timing pulses at the beginning of each said time period for entering said signal groups, in the order in which they occur, into said initial shifting register position and for thereafter transferring each said group away from said initial position from one said subsequent position to the next, said means being further operable to transfer signal groups stored in said shifting register positions to the unoccupied signal storage registers connected thereto so that said signal storage registers are consecutively loaded;

first multiplying means, connected to said initial shifting register position, operable each time period for cross-multiplying the digits of a first signal group stored in said initial shifting register position by the digits of a signal group stored in one of said signal storage registers connected thereto, and for cross-multiplying the digits of a second signal group stored in said initial position by the digits of a signal group stored in the other of said connected signal storage registers, thereby producing a plurality of first cross-product digit signals, said first multiplying means further operating to multiply the digits of each said signal group stored in said initial shifting register position by each other when said signal groups are the first two groups received by said shifting register, thereby producing a plurality of second cross-product digit signals;

a plurality of second multiplying means, one connected to each of said subsequent shifting register positions, operable each time period for cross-multiplying the digits of the signal group stored in the shifting register position by the digits of the signal groups stored in the signal storage registers connected to said position, thereby producing additional first cross-product digit signals, and for multiplying the digits of the signal group stored in the shifting register position by each other when the number of previously occurring signal groups by which said group has not been cross-multiplied has been reduced to a number less than two, thereby producing an additional second cross-product digit signal;

a plurality of adding circuits, one circuit assigned to each said shifting register position, each said adding circuit including a plurality of input circuits and output circuits and generating at one of its outputs a sum digit signal representative of the low order digit of the sum of the digits represented by digit signals received at its inputs and further generating at its remaining outputs carry digit signals representative of the carry digits of said sum, a plurality of sum digit storage registers, each one for storing the sum digit from a different one of said adding circuits except the adding circuit connected to said initial shifting register position, each having an input and an output circuit;

first signal conducting means connecting the output of each said sum digit storage register to an input of the adding circuit assigned to the next adjacent shifting register position toward said initial position;

a plurality of carry digit storage registers, each one for storing the carry digits from a different one of said adding circuits, each having an input responsive to the adding circuit whose carry digit it stores and an output circuit;

second signal conducting means connecting the output of each said carry digit storage register to an input of the adding circuit whose carry digit it stores;

digit transfer means operable each time period for transferring to the inputs of each said adding circuit first and second cross-product digit signals which contribute to the same digit of the product and which were generated during said time period by the multiplying circuit connected to the shifting register position to which said adding circuit is assigned and by the multiplying circuit connected to the next adjacent shifting register position away from said initial position, said digit transfer means further operating to transfer the sum and carry digit signals stored in each said sum and carry digit storage register, respectively, to the inputs of said adding circuit to which each said register is connected by said first and second signal conducting means; and means operative in response to said timing pulses at the beginning of each said time period to transfer the sum and carry digit signals appearing at the outputs of each said adding circuit to the inputs of the sum and carry digits storage registers, respectively.

References Cited

UNITED STATES PATENTS 3,302,008 1/1967 Mitchell ------------ 235—156

MALCOLM A. MORRISON, *Primary Examiner.*

D. H. MALZAHN, *Assistant Examiner.*